Dec. 8, 1970     M. F. WATERS ETAL     3,546,696
SPORTS COMPUTER SYSTEM

Filed June 17, 1969     12 Sheets-Sheet 1

INVENTORS
MICHAEL F. WATERS
ROY J. SPRY
VAUGHN K. MUNN
TRACY B. GUNDERMAN
HAROLD F. WOOD

BY

ATTORNEYS

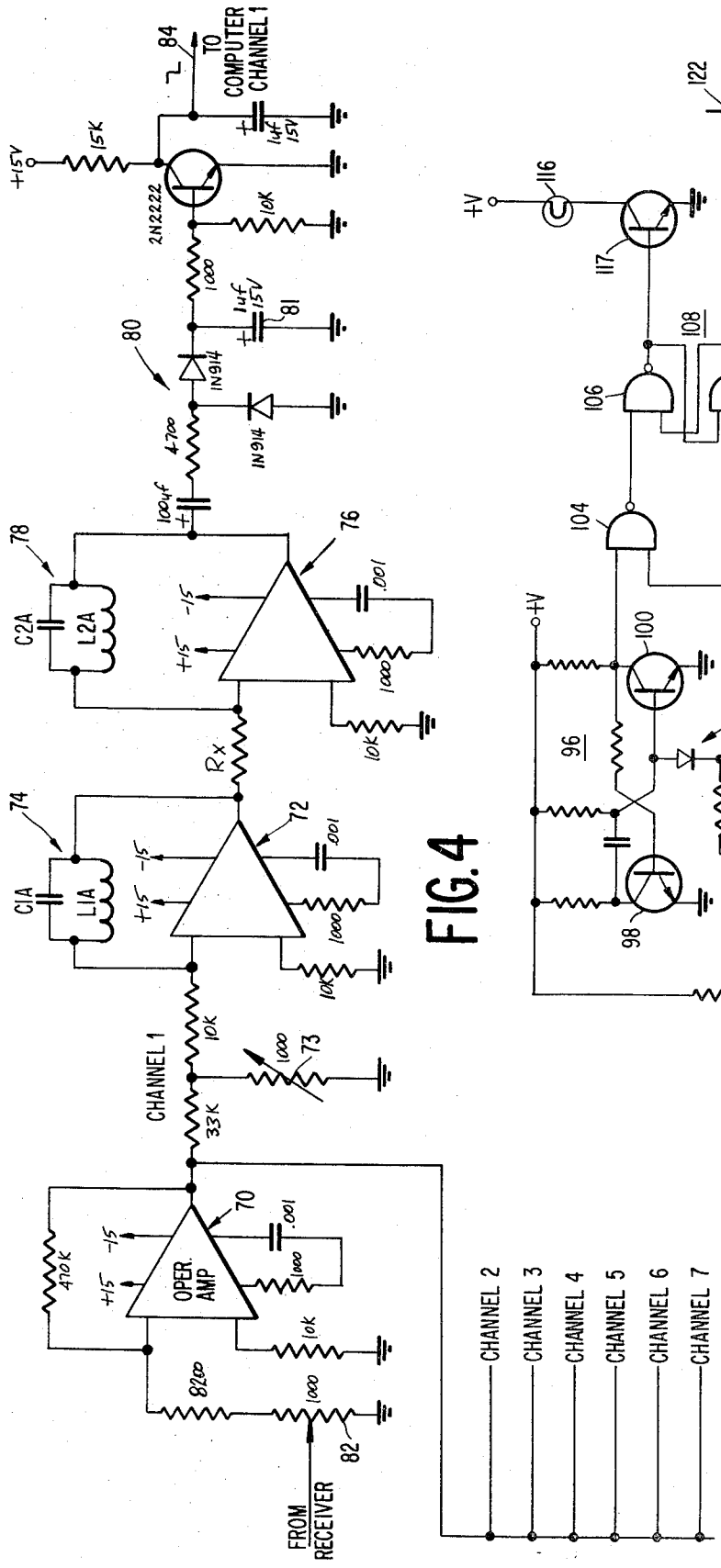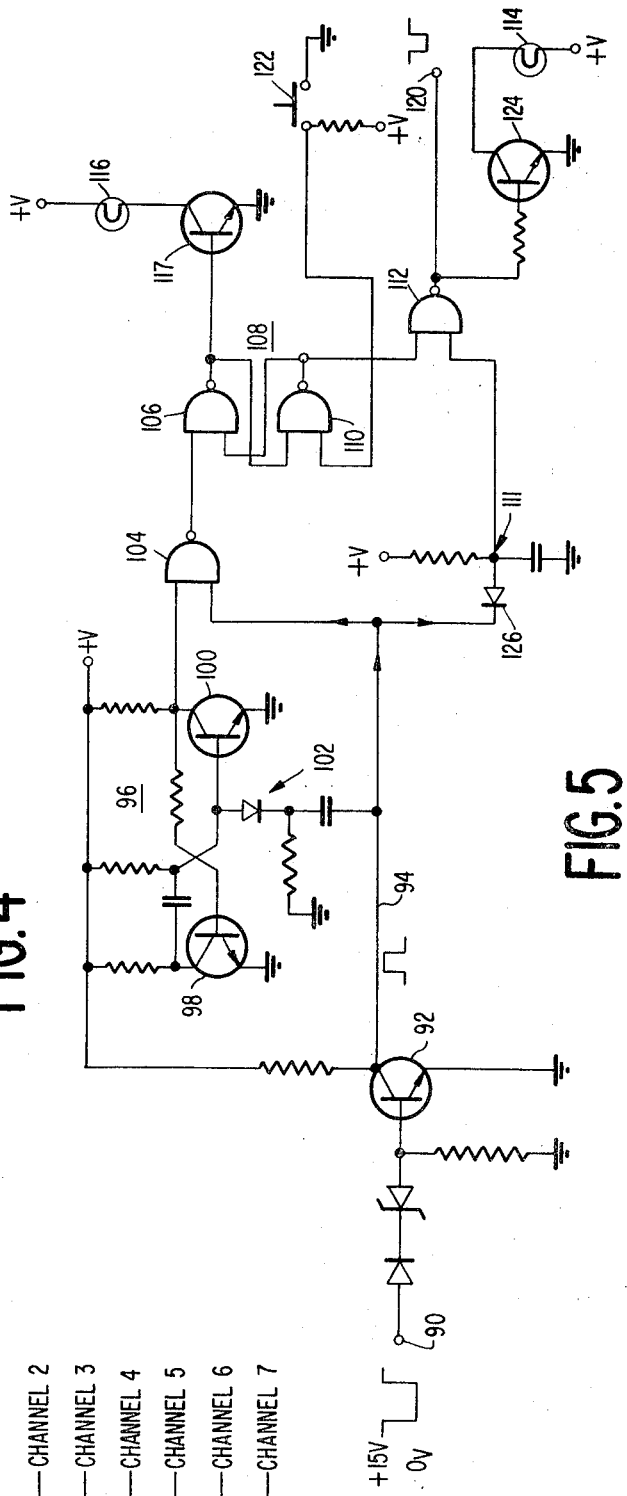

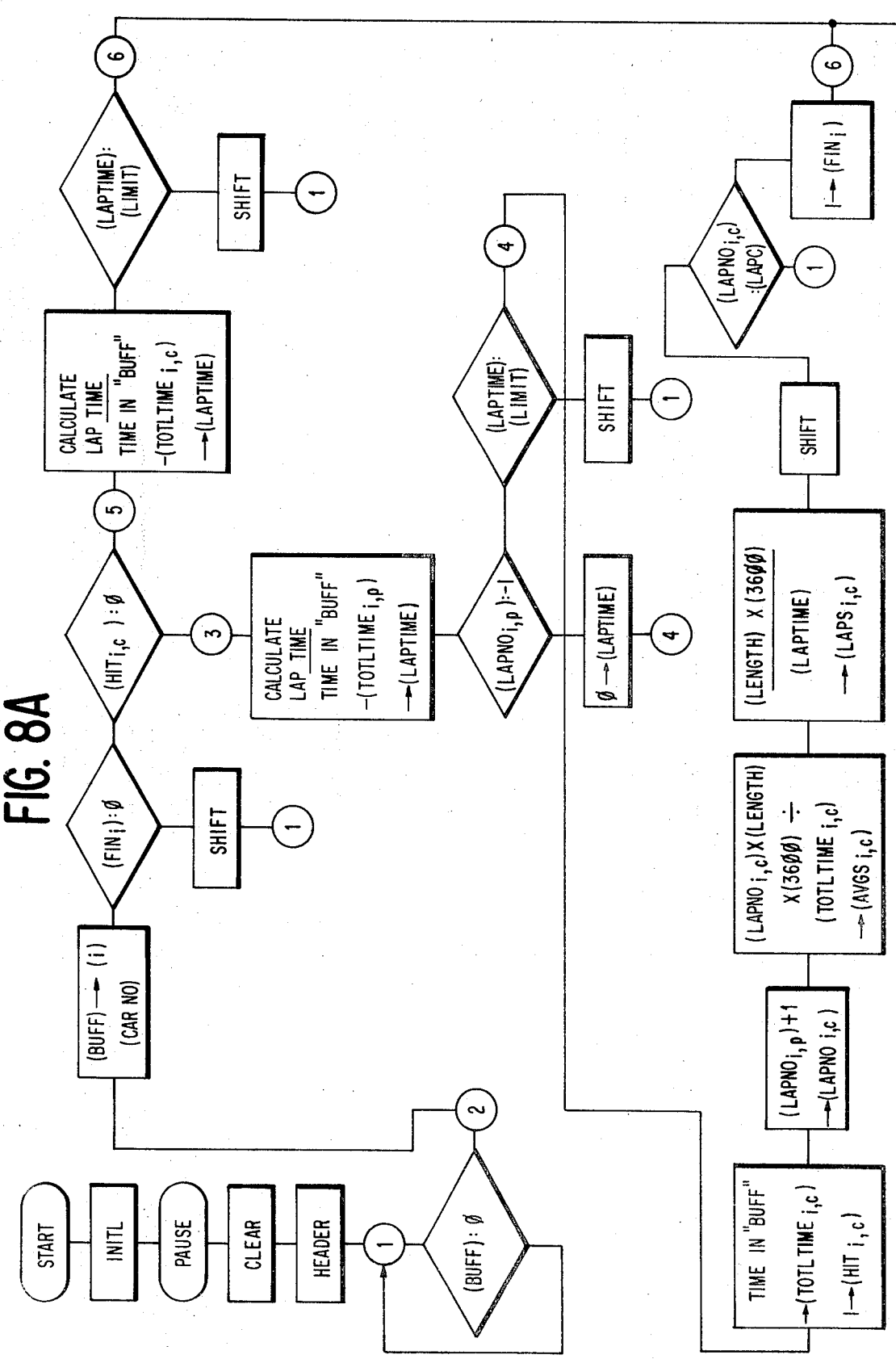

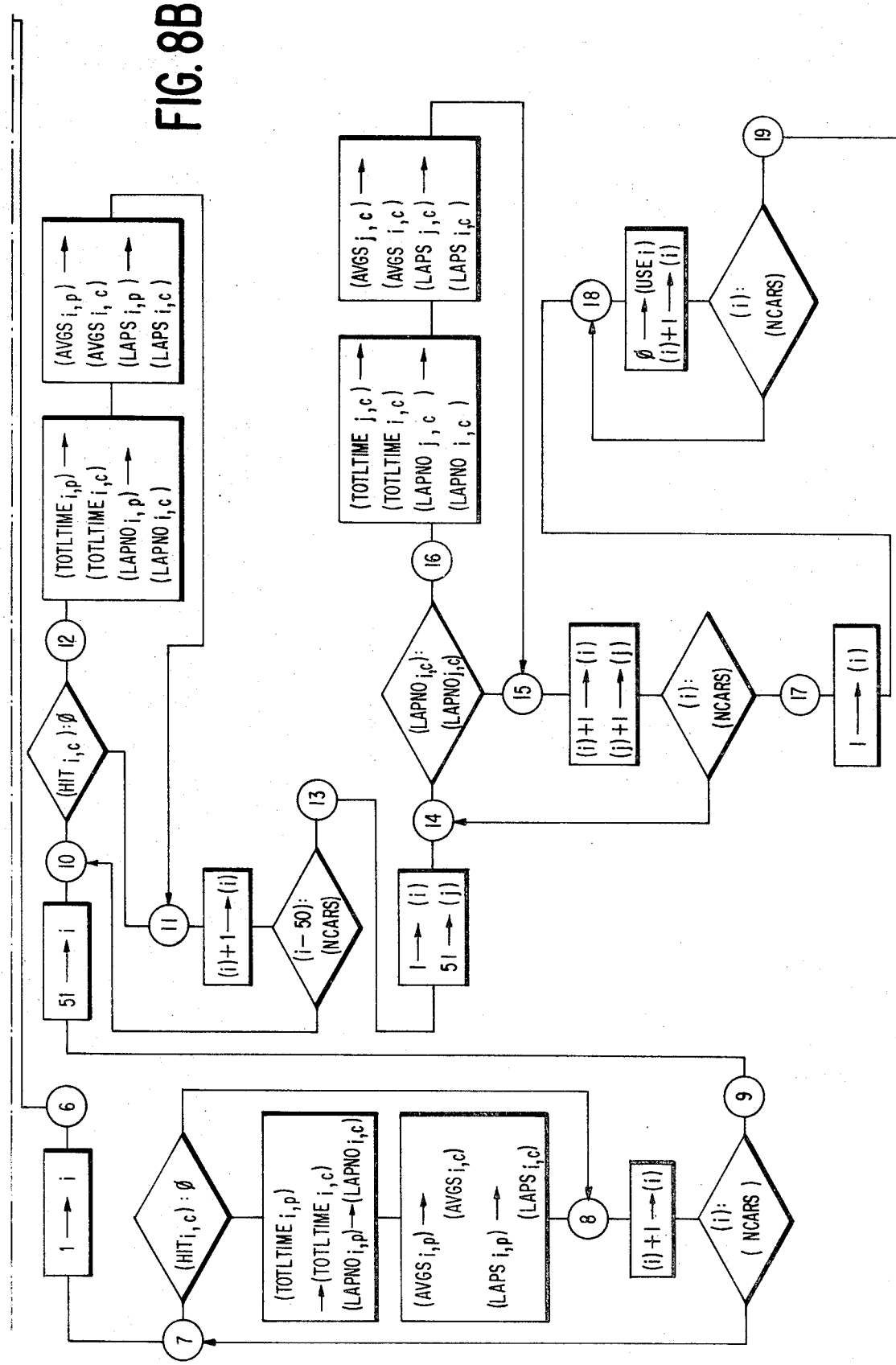

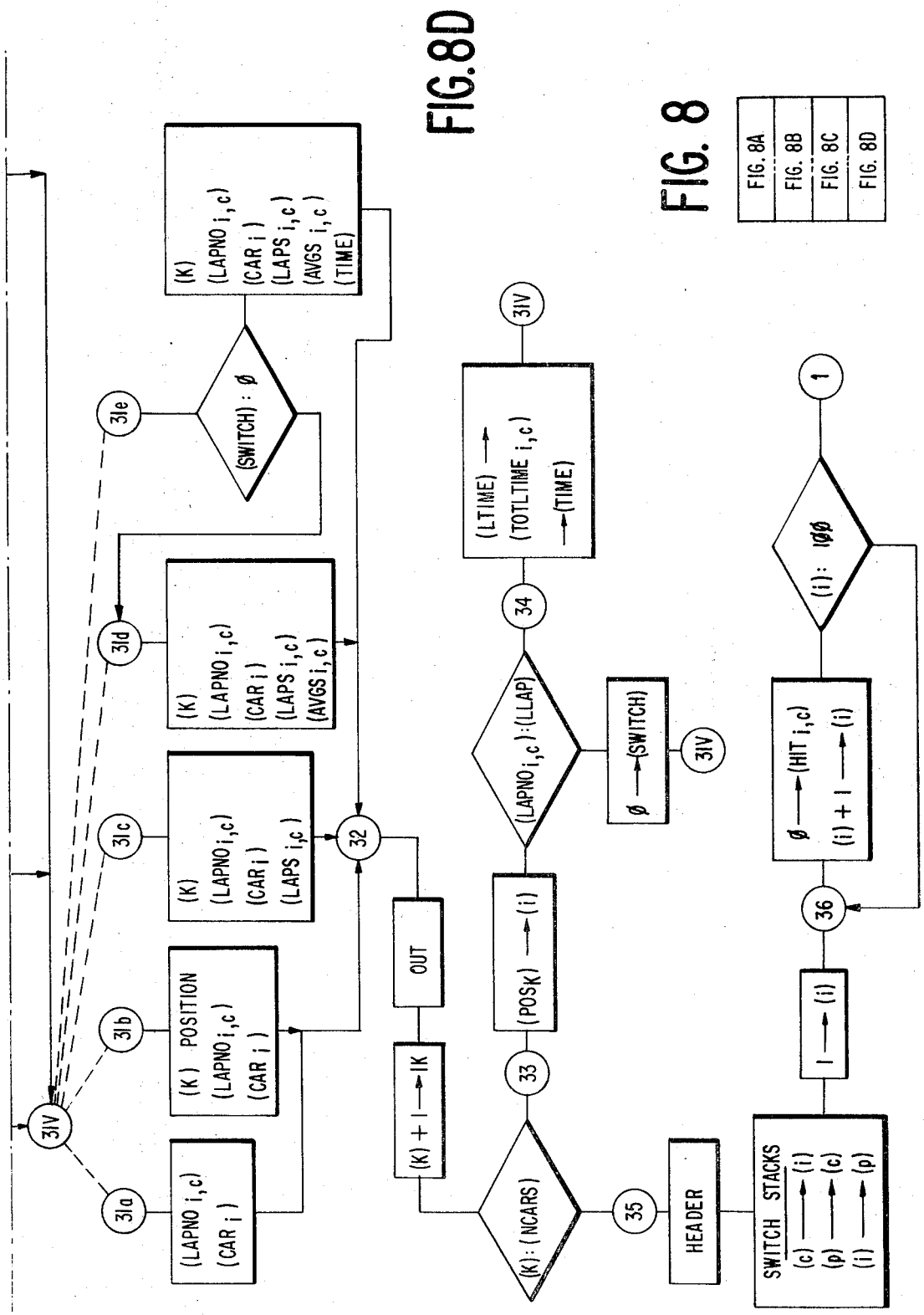

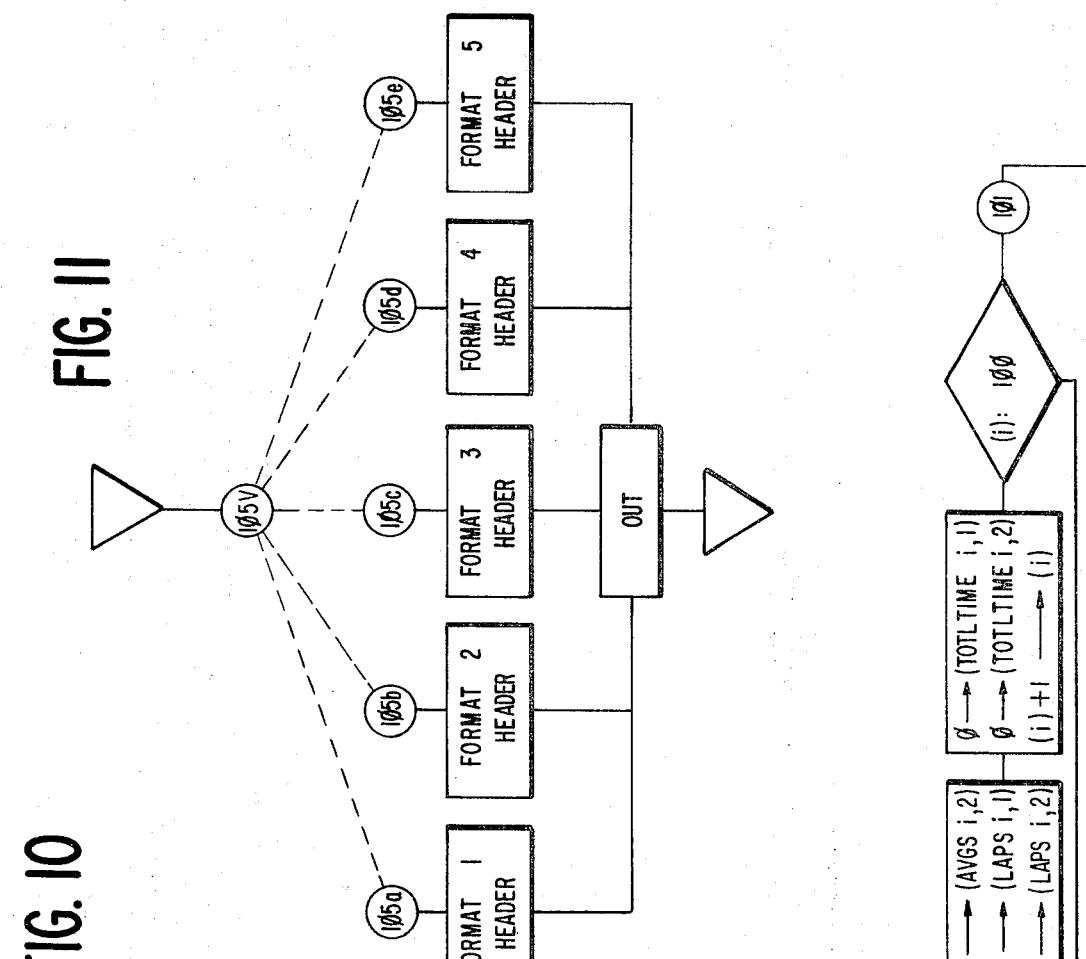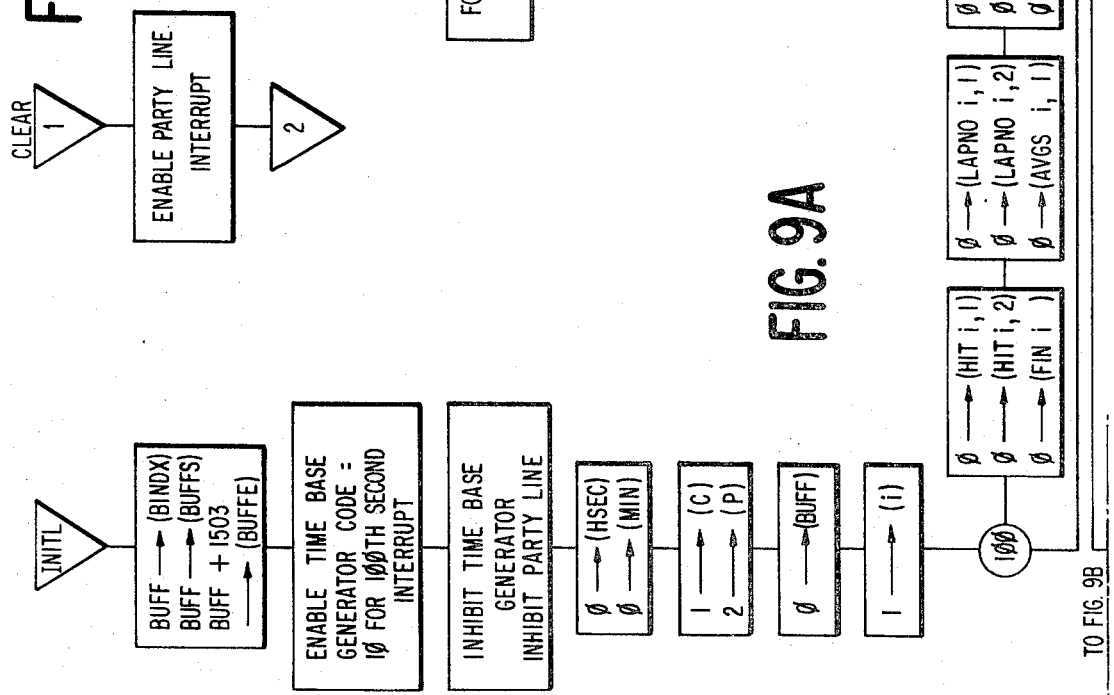

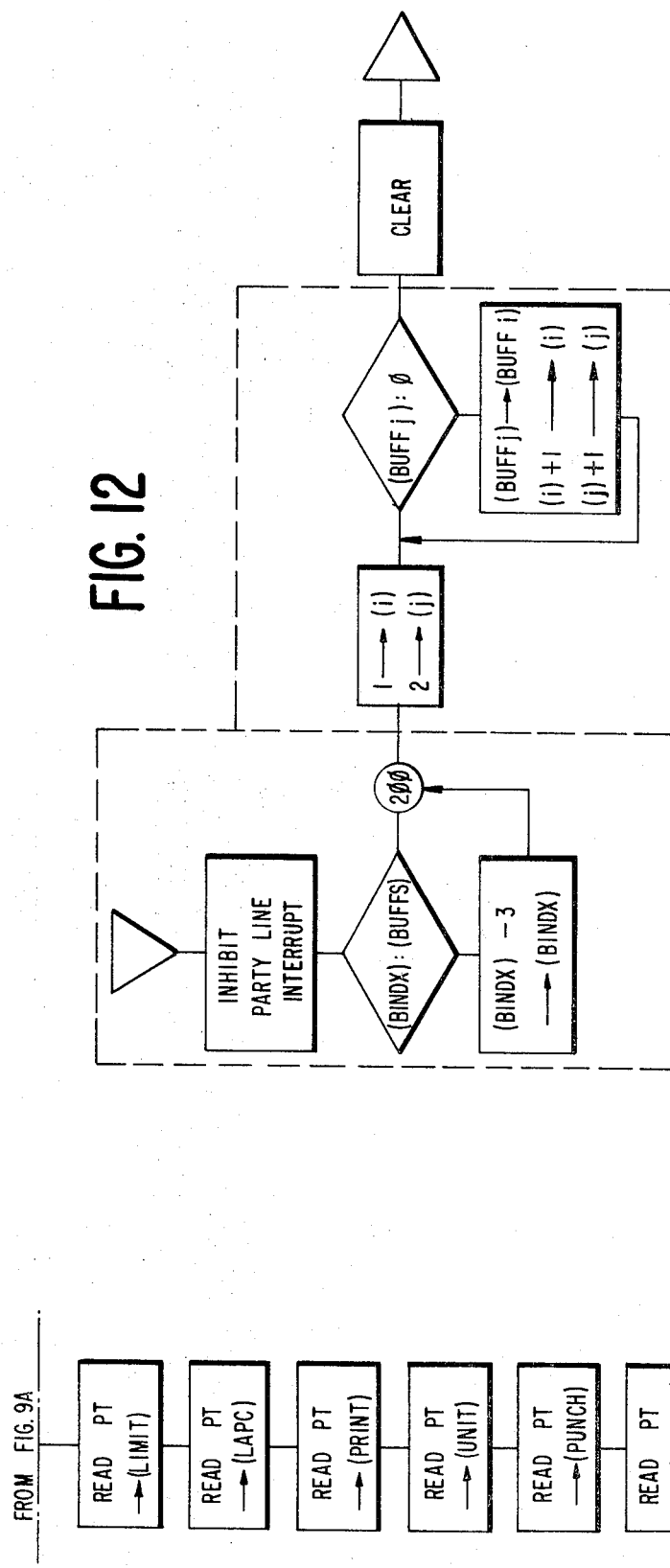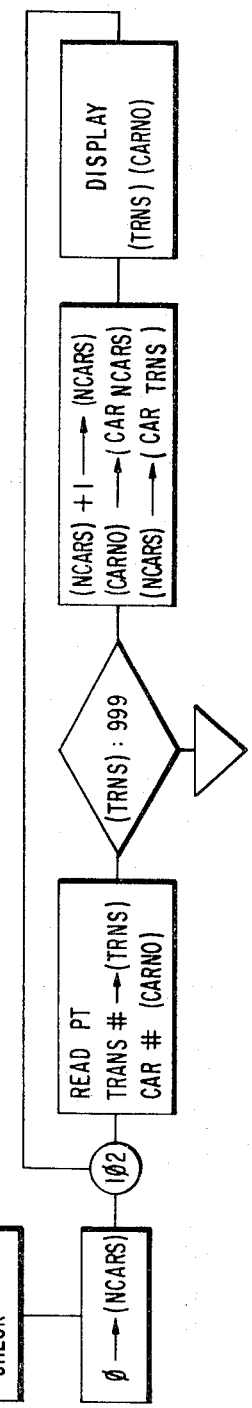

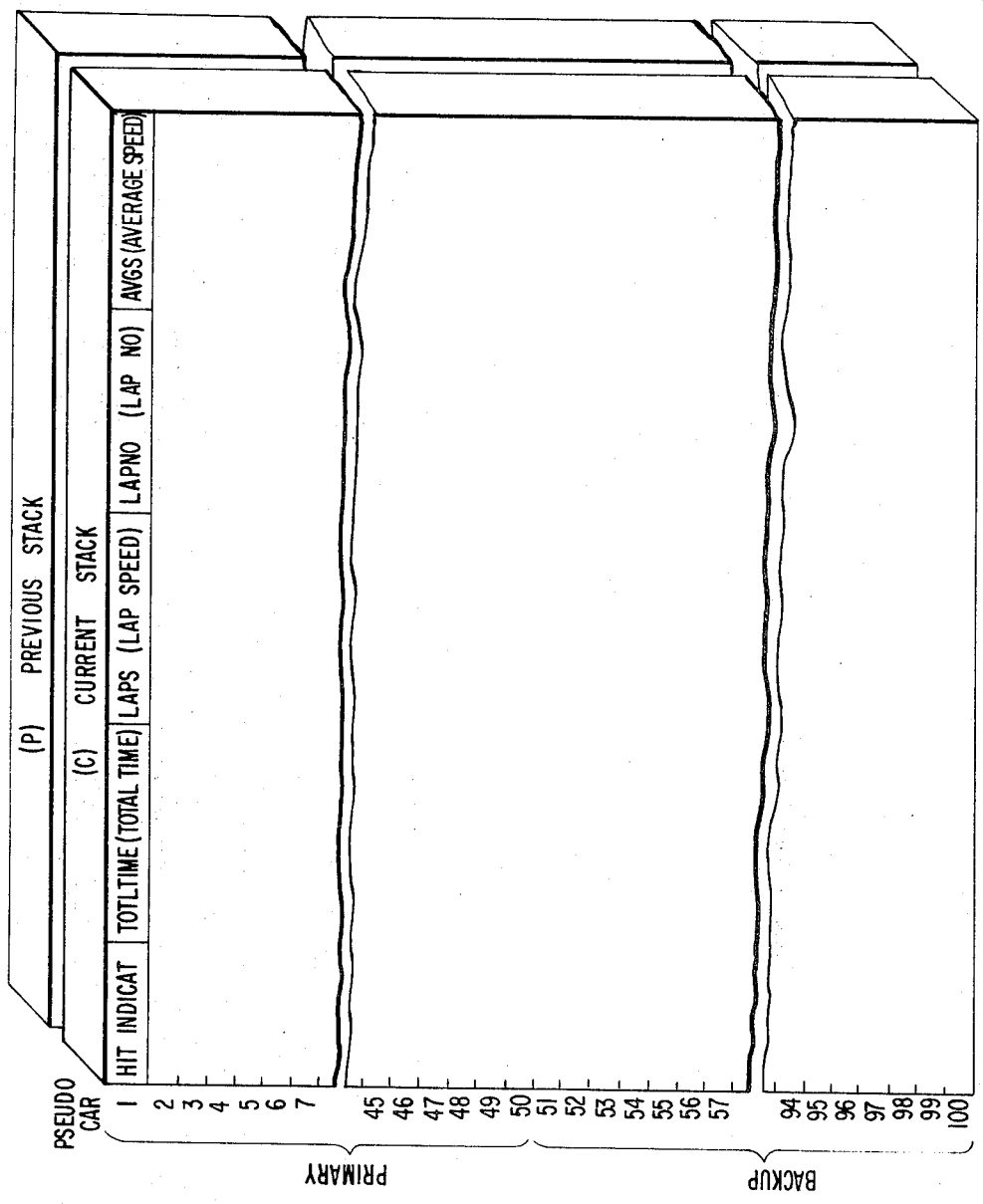
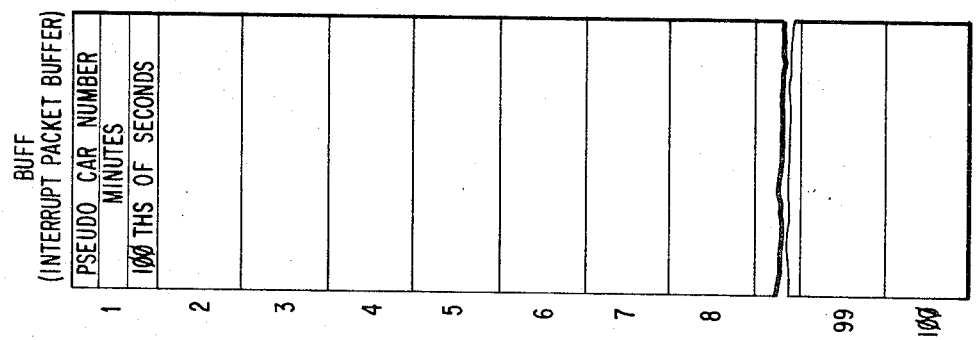
FIG. 15

United States Patent Office 3,546,696
Patented Dec. 8, 1970

3,546,696
SPORTS COMPUTER SYSTEM
Michael F. Waters, Utica, Roy J. Spry, Sauquoit, Vaughn K. Munn, Utica, Tracy B. Gunderman, Clinton, and Harold F. Wood, Frankfort, N.Y.; said Waters assignor to Digimetrics, Inc., Utica, N.Y.
Filed June 17, 1969, Ser. No. 833,987
Int. Cl. G01s 9/56; G06f 3/00
U.S. Cl. 343—6.5
25 Claims

ABSTRACT OF THE DISCLOSURE

A system and method of electronically scoring a race. In response to signals generated when the race cars pass a lap line on the track, the system calculates such items as total time between start of race and crossing lap line, number of laps completed, average speed, race lap speed, and relative position in race. The signals are generated by signal radiating devices on the cars; each one generates a unique signal. A backup system, manually actuated when each car crosses the lap line, provides a check of the electronically generated signals. Calculation is performed by a programmed digital computer which stores the most recent calculated data pertaining to each car.

BACKGROUND OF THE INVENTION

In events between entities, such as an automobile race, scoring of the race is of utmost importance for both the participants and the spectator. Despite the tremendous growth in popularity of such events as auto racing and the high speeds at which the automobiles traverse the race track, the basic elements of the scoring system are still the manually operated stop watch and a pencil and paper. A large number of officials are necessary to time each lap for each automobile, time the total elapsed time from the start of the race for each automobile, maintain an account of the relative positions of the automobiles and write this information on score sheets. All the score sheets from the officials are then used to compile the total scoring information on the race. This system not only is subject to human error but is so slow that an official account of the score is not available to the spectators until a long time, perhaps days, after the termination of the race. In a number of races, the announced scoring results immediately following the race have been inaccurate as shown by the tabulation of the official score.

Electronic methods have been proposed for scoring events such as auto races but have not provided a satisfactory solution to the problems of reliability and speed in calculating the race results.

SUMMARY OF THE INVENTION

A sports computer system for scoring events, such as high speed auto races, includes an auto-identifying signal generator on each car, a means for picking up the identity of a car at the instant it passes the start/finish line on the race track, and a computer for calculating information relating to the race for substantially immediate viewing. A radio frequency transmitting antenna placed just below the track along the start/finish line radiates a signal of sufficient strength to turn on the signal generating transponders which are affixed to the racing autos as the auto passes over the start/finish line. The transponder generates a unique frequency signal which is picked up by a directional antenna placed down track from the start/finish line. The detected unique signals are decoded and applied via multiple channels to a storage and sequencing mechanism. Each channel represents a separate auto and thus the time at which a channel contains a signal (hereinafter sometime referred to as a hit) indicates the time at which the auto passed the start/finish line. The storage and sequencing mechanism stores the "hit" until it is accepted by the computer. The hits are received by the storage and sequencing mechanism in a random manner in accordance with the passage of the start/finish line by the autos, but are applied to the computer in accordance with a preset sequence. However, due to the high speed of the computer, even if all cars pass the line at the same time, the delay in processing the last hit of the sequence would not represent a significant amount of time.

Each hit is processed by a digital computer which is programmed to maintain a running count of the time elapsed since the start of the race. The time at which each hit occurs is stored, and at the end of each lap, stored information relating to the position of the autos in the race, the total time for each auto and the time for the last lap for each auto is transferred to a computer output means such as a print-out mechanism or a punch mechanism or other visual output apparatus. Additional information relative to the autos and their positions and times in the race may be calculated and read out at the end of each lap.

BRIEF DESCRIPTION OF THE DRAWINGS

FIG. 4 is a schematic diagram of a portion of an audio decoder.
FIG. 5 is a partial block diagram of one channel of a primary interface means.
FIGS. 8a through 8d illustrate the primary program for calculating scoring data.
FIGS. 9a and 9b illustrate a program flow diagram of an initialized subroutine.
FIG. 10 is a program of a clear subroutine.
FIG. 11 is a program flow diagram of a header subroutine.
FIG. 12 is a program flow diagram of a shift subroutine.
FIG. 15 illustrates the use of the computer memory in carrying out the specific program of FIGS. 8 through 14.

DETAILED DESCRIPTION OF THE DRAWINGS

Figure 1:
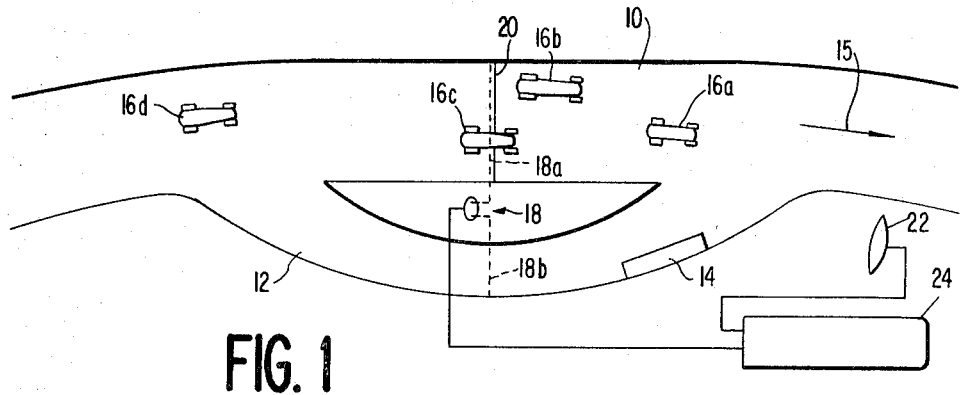
FIG. 1 illustrates the relation between the electronic system comprising the invention and a race track.

FIG. 1 illustrates an example of the relationship of the scoring system to an automobile race track. The track, a portion of which is indicated at 10, includes a branched area 12 which in turn includes a pit stop area 14. The start/finish line for the track is shown at 20 and four automobiles traveling in the direction of arrow 15 are illustrated at 16a through 16d. In accordance with a preferred embodiment of the present invention, a dipole antenna 18 is buried on the track just below the start/finish line 20. As illustrated in FIG. 1, one arm 18a of the dipole is under the main portion of the track and the other arm 18b of the dipole is under the branch portion of the track leading to the pit stop area 14. The reason for placing the portion of the dipole under the branched portion of the track is to account for those autos which enter the pit stop region on a given lap and thereby do not actually cross the start/finish line 20 on the main track. The dipole antenna 18 is supplied with power from a conventional transmitting means which may be housed in a trailer 24 near the track. Each of the automobiles 16a through 16d has a transponder affixed thereto, preferably on the bottom of the auto, which is turned on by the signal radiated by dipole antenna 18. The power of the transmitter and the threshold level of the transponders are set so that the transponder will turn on only as the automobile crosses the position where the dipole is buried. Once turned on, the transponder stays on for a predetermined period of time, e.g., 10 milliseconds, and radiates a signal which uniquely identifies that transponder. Since it is known in advance which transponders are on which cars, the unique signal also identifies the automobile. A radio frequency receiving antenna 22, preferably of the directional type, is placed in a position down track from the start/finish line and is directed so that its directional beam intersects the start/finish line. As a transponder turns on, the unique signal radiated thereby is picked up by receiving antenna 22 and conveyed to the system electronics which may also be housed in the trailer 24.

In a multi-lap race, every time a car passes the start/finish line 20, a signal uniquely identifying the car is conveyed to the system electronics for detection and processing. In the preferred embodiment described herein, the unique signal is a unique combination of a radio frequency modulated by an audio frequency. However, it will be apparent to those of ordinary skill in the art that other unique signals may be used, e.g., a separate radio frequency signal for every transponder, a common radio frequency with a different audio frequency modulator thereon for every transponder, etc. Also, it will be apparent to anyone of ordinary skill in the art that other methods for conveying a hit to the system electronics may be used. For example, if continuously operating transmitters are placed on the automobiles, the receiving antenna 22 could be eliminated and the dipole antenna 18 could be used as a receiving antenna which receives a signal of sufficient strength to indicate a hit each time a transmitter carrying car passes thereover. As another alternative, a highly directional receiving antenna could be placed so that the centerline of the directional beam crosses the track above and parallel to the start/finish line, it would also pass through the directional beam of the receiving antenna, thereby causing a hit indication to be sent to the system electronics.

Figure 2:
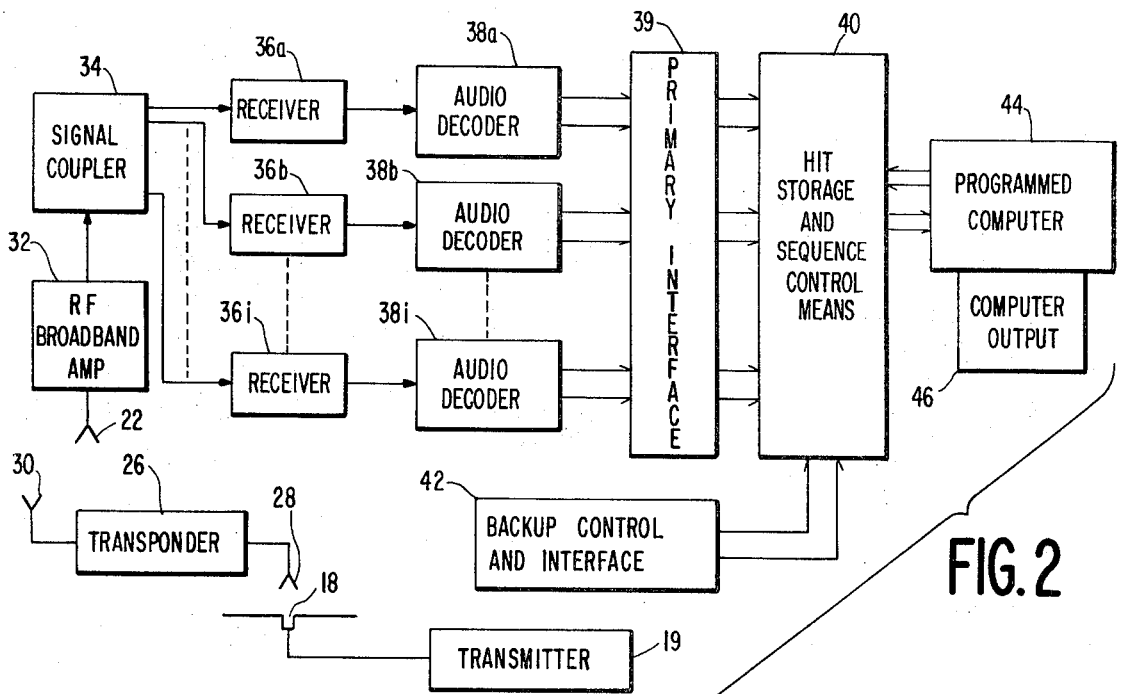
FIG. 2 is a block diagram of a preferred embodiment of the present invention.

FIG. 2 shows a block diagram of the electronics system of the present invention. The transmitter apparatus 19 for supplying the power to antenna 18 may be any conventional type of transmitter. The frequency of the transmitter should be placed in the megacycle region so that it is above the large noise spectrum generated by the automobile engines. The power is set in conjunction with the threshold level of the transponders 26 so that the transponder will be turned on only as the transponder passes over the buried dipole 18. The power will necessarily be relatively large due to the absorption by the ground of a large amount of that power. The transponder 26 includes a receiving antenna 28 which picks up the signal from dipole antenna 18, and a radiating antenna 30 which radiates omnidirectionally the unique combination of radio frequency modulated by audio frequency that identifies the car to which the transponder 26 is affixed.

The receiver antenna 22 picks up the audio modulated RF signal from transponder 26 and passes it through a radio frequency broad band amplifier 32 to a signal coupler 34 which divides the signal into nine equal components in the specific example described herein. It is assumed herein that there is a total of nine radio frequencies and seven modulating audio frequencies, thus allowing unique identifications for sixty-three automobiles. However, the specific embodiment will be described with the assumption that there are fifty automobiles in the race and each has a separate transponder affixed thereto. Each of the receivers 36a is set to one of the assigned radio frequencies and the respective outputs therefrom are applied to nine audio decoders 38a through 38i. The incoming hit signal passes through the receiver 36 which is tuned to the same radio frequency as the signal. The receiver 36 demodulates the signal and applies an audio output representing the hit to the connected audio decoder 38. Each audio decoder provides a logic output on one out of seven possible output leads. The seven output leads represent the seven possible audio frequency modulation signals. Consequently, the particular output from one of the audio decoders 38 which contains a logic output indicating a hit, identifies the particular car which just passed the start/finish line. The receivers 36 may be conventional tuned receivers and preferably are crystal controlled super heterodyne detectors and demodulators, each tuned to a different one of the nine RF frequencies.

The broad system described thus far is the primary system for generating logic hits which are processed in the scoring system in a manner to be described hereinafter. The primary system generates the hits without any intervention by human operators. A backup system is also provided for further enhancing the reliability of the system. The backup system generally comprises a backup control and interface 42 which has a series of buttons on the face thereof corresponding to the number of automobiles in the race. As an automobile passes the start/finish line, the backup operator depresses the button corresponding to that particular automobile, thereby generating a logical hit output on one of the 50 output leads from the backup control and interface 42.

The fifty outputs from the audio decoders 38 along with the fifty outputs from the backup control and interface 42 are applied to a hit storage and sequence control means 40 which operates to store the logical hits until they are called for by a programmed computer 44. The hit storage and sequence control means 40 includes 100 channels, each assigned to a different input line. When a logical hit is received at the input of a particular one of the channels, it is stored by the channel until a call signal (hereinafter sometimes referred to as a party line signal) is received from the computer 44. The channels are numbered consecutively and in response to a party line signal, the hit stored in the lowest numbered channel is transferred to the computer 44. As will be described in connection with the detailed description of the hit storage and sequence control means, the logical hit input to a channel is represented by a particular voltage level input and the hit output is represented by an eight-bit address which identifies the car and whether or not the hit indication is from the backup system or the primary system. When the hit indication is transferred to the computer, it is also removed from storage in a channel of the hit storage and sequence control means 40. It will be noted that the processing operation is so fast that even if all fifty cars passed the start/finish line at the same time, the delay between entering a hit representing car 50 into means 40 and transferring that hit to the computer 44 would not be significant, and the time at which the hit for the latter car is transferred to the computer 44 would represent a very accurate measure of the time at which the car traversed the start/finish line.

The computer 44 in accordance with a preferred embodiment of the invention, is a programmed digital general purpose computer. As will be apparent to any one of ordinary skill in the art, the processing which is carried out by the programmed digital general purpose computer 44 could also be carried out by a specially designed logic system which corresponds to the program. In general, the computer 44 accumulates a representation of time elapsed from the start of the race and records that representation each time a hit indication is received. Also, the lap time is calculated by comparing the previous hit time for the particular car with the current hit time. The number of laps traversed by each car is stored and continuously updated and the relative positions of the cars is determined by a comparison of the number of laps travelled and the time it took the car to travel those laps. As the hits are accepted by the computer 44, they are stored in a current stack (an array in the computer memory). If a car already has a hit in the current stack, and if the time between the two hits for that particular car is a valid lap time (as compared to some impossible limit), then the current lap has been completed and the computer outputs its stored information. The output may be any conventional computer output mechanism such as a punch tape output, a teletypewriter output, a cathode ray display output, etc. The output means is shown generally at 46. The output data may also be used to drive a large display board of the type presently found in many stadiums throughout the country. Since many methods and apparatus for outputing computer information are well known in the art, further details of a computer output mechanism will not be described herein.

Figure 3:
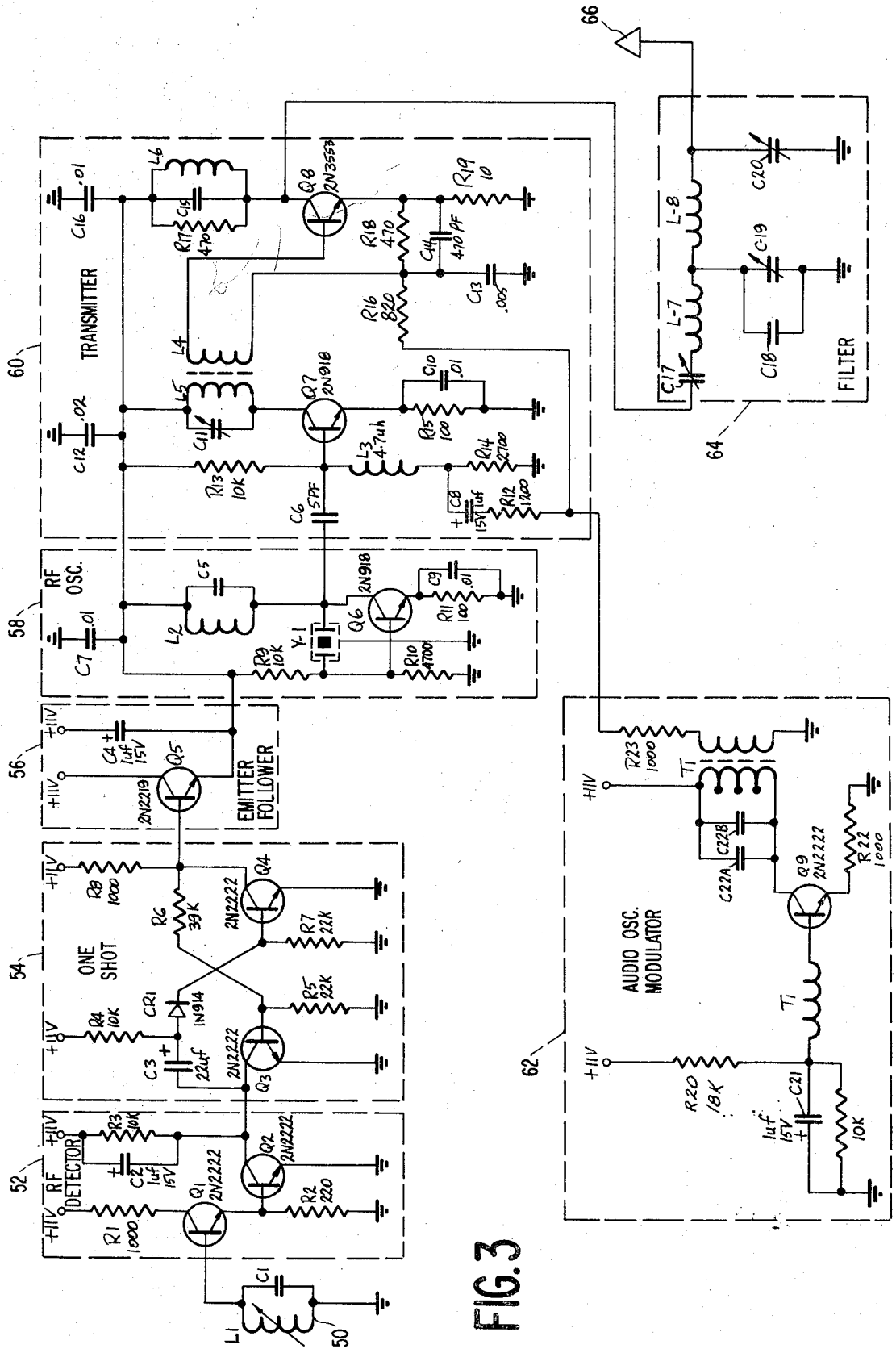
FIG. 3 is a schematic diagram of a transponder.

A specific example of a circuit capable of use as a transponder is illustrated in FIG. 3 of the drawings. A loop antenna 50, comprising a tunable inductance L1 and capacitor C1 connected in parallel is tuned to resonate at the frequency of the signal transmitted by transmitting antenna 18 (FIG. 2). The loop antenna output is applied to a radio frequency detector of conventional type comprising transistors Q1, Q2, and the associated circuitry shown. The output of the radio frequency detector is then used to trigger a single shot 54 comprising transistors Q3, Q4, and the associated circuitry. The resistor $R_2$ in the radio frequency detector 52 sets the threshold level of the transponder. When the signal received is large enough to overcome the bias on transistor Q1, which is set by the large value of $R_2$, the transistor Q2 is turned on thereby placing its collector electrode at substantially ground potential. The negative going signal applied to the collector of transistor Q3 fires the single shot. The single shot provides a 0.1 second output to the emitter follower circuit 56. The emitter follower circuit 56, comprising transistor Q5, operates as a gate to connect the positive supply at the collector thereof, to the RF oscillator 58 and transmitter 60 in response to the 0.1 second output from the single shot 54.

The RF oscillator 58 only operates when power is applied thereto via the emitter follower transistor Q5. The RF oscillator 58 comprises a crystal Y–1, a transistor Q6, and associated circuit elements. The radio frequency output from RF oscillator 58 is applied as one input to a modulator 60. The other input to the modulator 60 is supplied by the audio oscillator 62. It will be noted that power is supplied to the audio oscillator 62 continuously so that it does not depend upon gating of the emitter follower circuit 56. The audio oscillator is a conventional Hartley oscillator and comprises a transistor Q9, transformer T1 and associated circuit elements. The audio signal from audio oscillator 62 modulates the RF signal from RF oscillator 58 in the conventional modulator 60. The modulated output signal is then applied through a low pass filter 64 to the transmitting antenna 66. The purpose of the low pass filter 64 is to reject harmonics of the output frequency. The antenna 66 may preferably be a whip antenna, which is simply a piece of wire. The transponder circuit described thus responds to a signal from the transmitting antenna 18 (FIG. 2) to turn on and radiate a radio frequency signal modulated by an audio signal for 1/10 second.

As described above in connection with FIG. 2, the audio output signals from the nine receivers 36 are supplied to nine identical audio decoders 38. Each audio decoder contains seven channels, tuned, respectively, to the seven possible audio modulating frequencies in the transponders. The channel which is tuned to the received audio frequency provides a logical output indicating a hit for the corresponding transponder. One specific example of an audio decoder capable of operating in the system of FIG. 2 is illustrated in FIG. 4. The demodulated audio signal from the receiver is applied via potentiometer 82 to an operational amplifier 70. The output of the operational amplifier 70 is applied to seven channels. Only one of the channels is shown in detail; the other channels being identical with the exception of the frequency to which the tuned circuits are tuned. Each channel includes two cascaded stages of tuned amplification 72 and 76. Stage 72 comprises an operational amplifier with a tuned feedback circuit 74, and stage 76 comprises an operational amplifier with tuned feedback circuit 78. The capacitance and inductance of the tuned circuits 74 and 78 are selected to provide frequency selectivity at the desired audio frequency. The input potentiometer 82 and the variable resistors 73 appearing in each channel are adjusted so that the output peak to peak voltage level at the second stage of tuned amplification for each channel is the same. The output from the tuned amplification stage 76 is applied to a half wave rectifier 80 and then to a capacitor 81. When the audio decoder receives an input which is at the same frequency to which the illustrated channel is tuned, the positive voltage built up across capacitor 81 will be sufficient to turn on transistor 83 thereby dropping the voltage on output line 84 from +15 volts to 0 volts. A zero volt output on any of the output leads from any of the audio decoders represents the occurrence of a hit for the transponder corresponding to the channel on which the output appears.

Referring back to FIG. 2, fifty outputs from fifty channels in the audio decoders 38 are applied to a primary interface 39 which serves the purpose of preventing erroneous multiple pulses from overloading the computer system. In the specific example, the primary interface includes fifty identical channels, and a detailed description of one such channel is illustrated in FIG. 5. In the channel of the primary interface, as shown in FIG. 5, a negative going pulse from a corresponding channel of an audio decoder is applied to terminal 90 and results in a negative going output pulse at terminal 120. Any subsequent input pulses occurring within a predetermined time following a prior input pulse, e.g., two seconds, is blocked from the output. Also an indicator lamp 116 is turned on thereby indicating an error. It will be apparent that the occurrence of two hits on the same channel within two seconds must be the result of some error in the primary system since an auto could not complete a lap in two seconds. The most probable cause of an error which would result in either plural pulses at terminal 90 within two seconds or a continuous input at terminal 90 would be due to the transponder triggering in response to automobile noise or locking in the on condition. In any case, when the lamp 16 turns on, indicating the occurrence of an error, the primary system for that channel is shut off and the backup system (described generally in connection in FIG. 2) is used.

The primary interface channel includes an inverting transistor 92, a one shot multivibrator 96, a pair of NOR gates 104 and 112, a flip-flop circuit 108 comprising NOR gates 106 and 110, delay means 111, lamps 116 and 114, lamp driving transistors 117 and 124, and flip flop reset switch 122. Under normal conditions, the flip flop is in the reset condition and the output of the flip flop taken from NOR gate 110 is an up level signal and is applied to one input of NOR gate 112. The other input of NOR gate 112 is a down level, or ground level signal, which is supplied via diode 126 and the normally conducting transistor 92. Consequently, the output at terminal 120 is at an up level. When an input pulse appears at terminal 90, it is inverted by inverting transistor 92 and applied via lead line 94 to the delay means 111. When the positive pulse is applied to the cathode of diode 126, the charge on capacitor 111 starts to build up and in a very short time reaches a level which drives the output of NOR gate 112 down. Thus, the down level input pulse effectively passes to the output terminal 120.

The inverted pulse on lead 94 is also connected to the one shot multivibrator via connecting means 102 which includes a capacitor and a diode connected to the base of transistor 100. The lagging edge of the inverted pulse triggers the one-shot multivibrator which provides a positive going output pulse having a duration of two seconds. The latter output pulse is applied as one input to the NOR gate 104. Under normal conditions, the inverted pulse and the multivibrator output pulse will not be in coincidence and therefore the NOR gate 104 will not provide an output pulse to trigger the flip flops 108. However, if a second input pulse appears within the two second time limit, it will be inverted by transistor 92 and passed to NOR gate 104 thereby causing the output of NOR gate 104 to drop to a low level logic voltage. The low level logic voltage sets flip flop 108 by driving the output of NOR gate 106 up and driving the output of NOR gate 110 down. The low level output from flip flop 108 is applied to the NOR gate 112 and effectively inhibits NOR gate 112. The purpose of the delay means 111 is to prevent the second pulse from being applied to NOR gate 112 until the flip flop 108 is set. When the latter condition occurs, the up level output from NOR gate 106 turns on transistor driver 117 thereby causing error lamp 116 to light up. When this occurs, the operator knows there is something wrong in the primary system for this particular channel. On the other hand, if the system is operating normally, the lamp 114 will blink in response to each output pulse.

The down level output pulses, representing hit indications, from the fifty channels of primary interface 39 (FIG. 2) are applied to channels 1 through 50 respectively of the hit storage and sequence control means 40. Channels 51 through 100 of the hit storage and sequence control means 40 receive "backup" hit indications from the fifty outputs of the backup control and interface 42, an example of which is shown in detail in FIG. 6.

Figure 6:
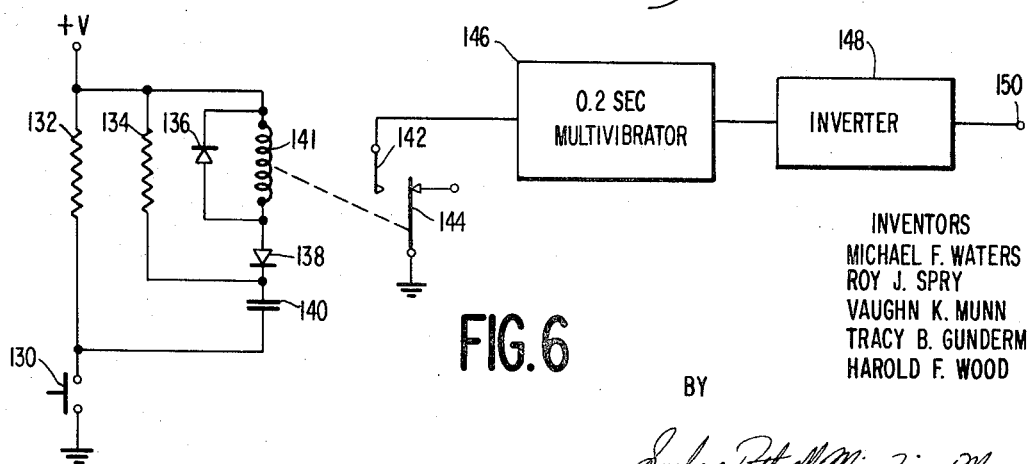
FIG. 6 is a schematic diagram of one channel of a backup control and interface circuit.

The backup control and interface 42 includes a panel (not shown) containing at least 50 buttons, each representing one of the transponder-autos in the race. Each button is connected to a separate channel, each of which operates in response to the depression of the button to provide a 0.2 second negative going output pulse representing a hit for the corresponding transponder-auto. Since all 50 channels in the backup control and interface 42 are identical, only a single channel is illustrated in FIG. 6. The channel includes a relay coil 141 in series with a diode 138 and a capacitor 140. A diode 136 is in parallel with relay coil 141, a resistor 134 is in parallel with the series connection 141 and diode 138, and a resistor 132 is in parallel with the series connection of relay coil 141 and diode 138 and capacitor 140. When the manual button 130, appearing on the backup control and interface panel, is depressed by the operator upon seeing the corresponding auto pass the start/finish line, the relay coil 141 is energized thereby causing switch arm 144 to make contact with terminal 142. The latter connection triggers a 0.2 second multivibrator 146 which provides a 0.2 second positive going output pulse. The latter pulse is inverted in an inverter 148 and applied to the output terminal 150. It will be noted that if both the primary and backup systems are operating correctly each time a single car passes the start/finish line the hit storage and sequence control means 40 (FIG. 2) will receive a pair of hit indications, one from the primary system and one from the backup system. The channels are interconnected and numbered so that for a given car the primary channel differs from the backup channel by the number 50. Thus, if the car carrying the transponder which is designated as the first transponder passes the start/finish line, a hit indication will be applied to the first channel on the hit storage and sequence control means 40 by the primary system and a hit indication will be applied to the fifty-first channel of the hit storage and sequence control means 40 by the backup system.

Figure 7:
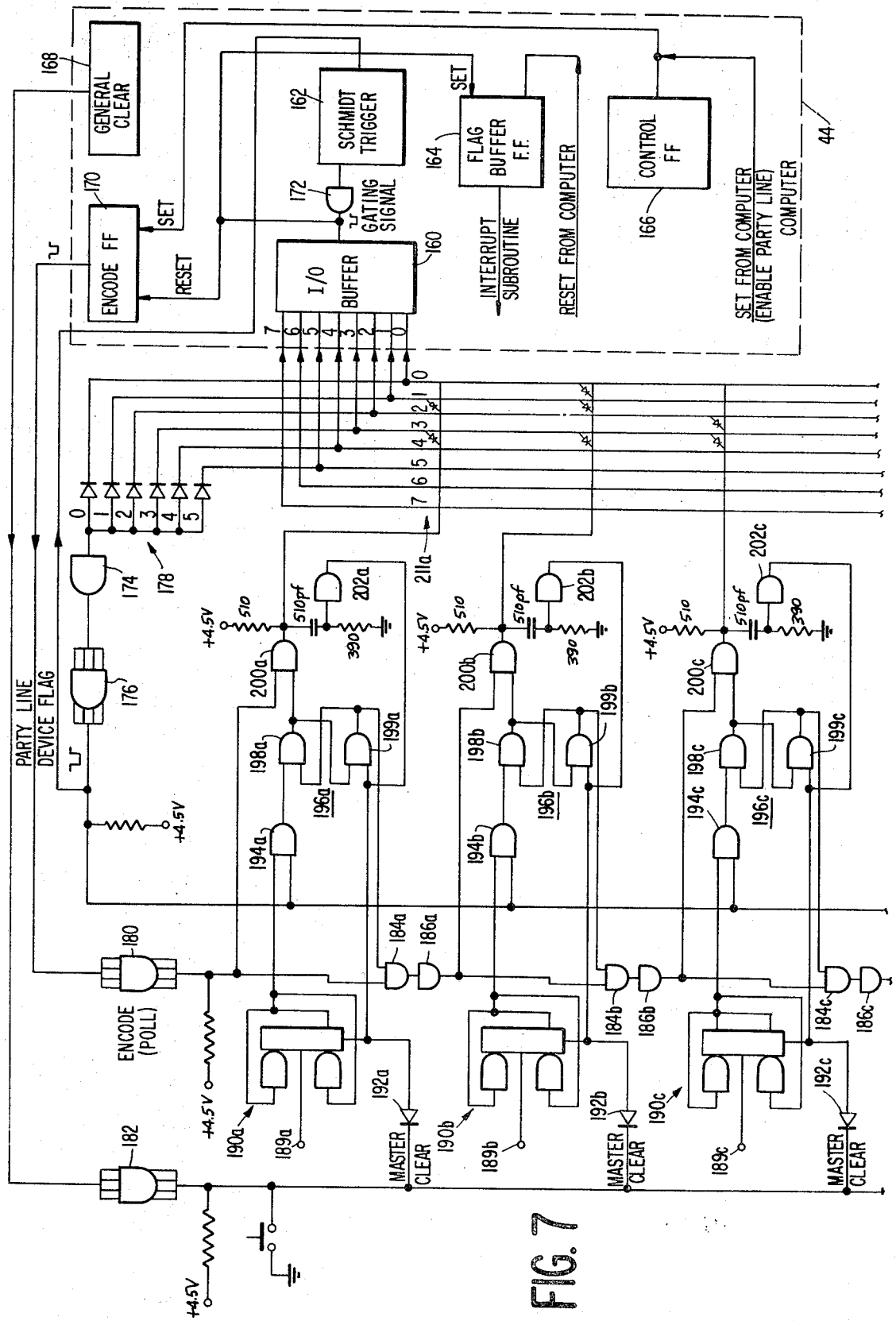
FIG. 7 is a detailed block diagram of a hit storage and sequence control means and its interfacing with a computer.
Figure 8C:
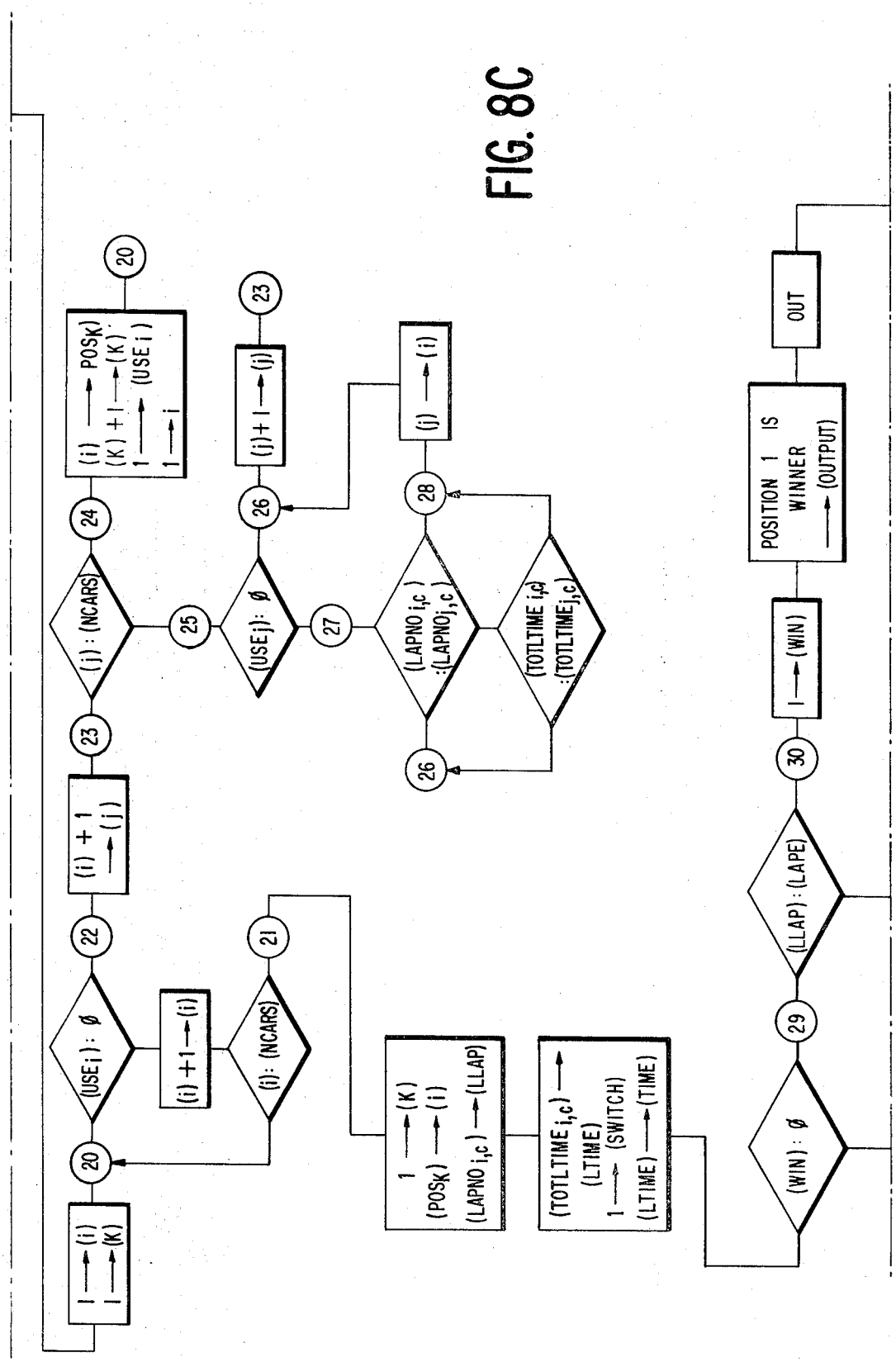

FIG. 7 illustrates a detailed example of the hit storage and sequence control means along with those parts of the computer 44 which interface with the hit storage and sequence control means. As mentioned above, in the preferred embodiment of the present invention, the computer 44 is a general purpose digital computer programmed in a manner to be described in more detail hereafter. The elements within the large block 24 of FIG. 7 represent part of the computer which are specially wired, in accordance with the present invention, to properly interface the computer with the remainder of the system. In FIG. 7, only three of the 100 channels of the hit storage and sequence control means are illustrated, but all the remaining channels are identical thereto. The small letter a is used to designate the elements in the first channel, the small letter b is used to designate the elements in the second channel, and the small letter c is used to designate the elements in the third channel. Those elements in the hit storage and sequence control means which are common to all of the channels have no letter designation.

When a hit indication arrives at an input terminal 189, it sets a JK flip flop 190. In the reset state, the output of the JK flip flop is down or low and it goes up when set. A NOR gate 194 receives the output from JK flip flop 190 and also receives a second input from a flag line which is normally up and is common to all channels. Since the flag line is normally up, the up pulse from the JK flip flop results in a down pulse at the output of NOR gate 194, the latter pulse serving to set flip flop 196. Flip flop 196 comprises interconnected NOR gates 198 and 199. When in the reset condition, the output of NOR gate 198 is down and the output of NOR gate 199 is up. When set by a down level signal from NOR gate 194, the output from NOR gate 198 goes up and the output from NOR gate 199 goes down. The latter down level signal inhibits NOR gate 184. The other input to NOR gate 184, as will be described more fully hereafter, is a party line (POLL) signal which is generated by the computer when it is ready to transfer a hit indication from the hit storage and sequence control means to the computer input/output buffer 160. When NOR gate 184 is inhibited by the set condition of flip flop 196, the party line signal is prevented from being applied to the succeeding channels. This insures that the sequence of transferring hit indications to the computer always follows the pattern of lowest numbered hit indication first.

The flip flops 190 and 196 represent two levels of storage in each channel for the hit indication. The first level of storage, flip flop 190, stores a hit indication as soon as it arrives without need for the occurrence of any additional condition. The hit indication is then transferred to the second level of storage, flip flop 196, provided the flag line is in the normal up condition. The hit, stored by the set condition of flip flop 196 is transferred to the input/output buffer 160 of computer 44 in response to a party line signal which is generated as follows. In the computer program, as will be described in more detail hereafter, there is an instruction to "enable party line." This instruction sets a flip flop 170 which provides a down level pulse output on the party line. The down level pulse on the party line is applied to a power inverter 180 which inverts the pulse and applies the positive output pulse to the NOR gate 4. The latter party line signal drives the output of NOR gate 200 down provided a hit is stored in flip flop 196. The effect of the latter is to apply down level pulses through the diode matrix 211 to the input/output buffer 160 of the computer.

As illustrated, each of the channel output lines is connected to 8 lines leading into the input/output buffer 160 by a diode matrix 211. The particular connections, as is well known in the art, provide a coded input on the eight input lines. The particular code used in the preferred embodiment is an eight-bit code. The first seven bits occupying lines 0 through 6 indicate the transponder which went over the start/finish line and thereby caused the hit indication in the particular channel. The eighth bit, appearing on line 7, indicates whether the hit indication is a primary hit indication or a backup hit indication.

The eight lines which are connected to the input of the input/output buffer 160 are also connected via individual diodes 178 to the series connected inverters 174 and 176. Thus, whenever a down level hit indication appears in the output line of any of the channels, it is connected to the input of inverter 174 resulting in a positive level being applied to the input of power inverter 176 and a down level appearing at the output of power inverter 176. The down level output from power inverter 176 is referred to as the DEVICE FLAG and it operates to gate the hit indication address into the input/output buffer 160 of computer 44. The DEVICE FLAG also operates to inhibit transfer of the hit indication in every channel from the first level storage to the second level storage. The former function is accomplished by connecting the negative or down level DEVICE FLAG to a Schmitt trigger 162 which provides an output that is inverted in inverter 172 and applied to the input/output buffer 160. The latter signal operates as a gating signal such that when it is received, the digital address appearing on the eight input leads to the input/output buffer is entered into the input/output buffer in a well known manner. The gating signal from inverter 172 also operates to reset the flip flop 170 thereby removing the party line signal. As mentioned above, when the party line signal is removed, there can be no further transfer of any hit indication address to the computer.

The gating signal from inverter 172 also sets a buffer 164 in computer 44. The latter flip flop, when set, initiates an interrupt subroutine program which will be described in more detail hereinafter. Basically, the interrupt subroutine program operates to transfer the address just entered into the input/output buffer 160 into an array within the computer memory and operates upon that data.

As described above, the output from NOR gate 200 operates to apply a digital address to the computer. It also operates to reset the flip flops 190 and 196 in the following manner. When the output of NOR gate 200 goes down, the down level pulse applied to inverter 202 is inverted and applied to the reset inputs of flip flops 190 and 196. Thus, the hit storage and sequence control means receives the hit indications from the primary and backup system, stores them in channels which correspond to the transponders causing the hit indications, transfers the hit indications to the input/output buffer of the computer when the party line is active, and initiates an interrupt subroutine in the computer program. The predetermined sequence by which the hit indications are transferred to the computer may be described generally as follows. The storage and sequence control means contains N channels, numbered 1 through N. In response to activation of the party line, the hit indication stored in the lowest numbered channel is transferred to the computer. Whenever a transfer occurs, the hit indication is removed from storage in the channel.

Figure 13:
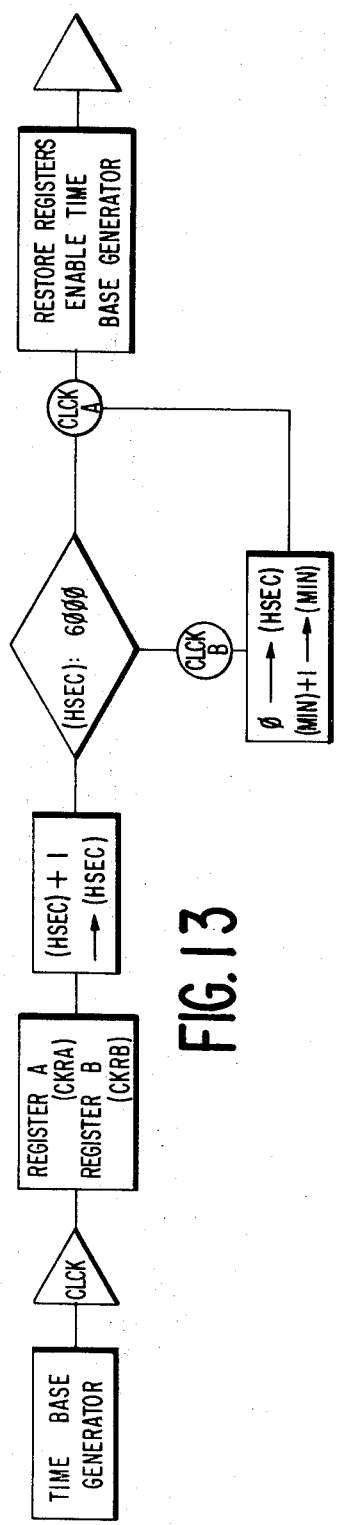
FIG. 13 is a program flow diagram of the time base generator interrupt subroutine.
Figure 14:
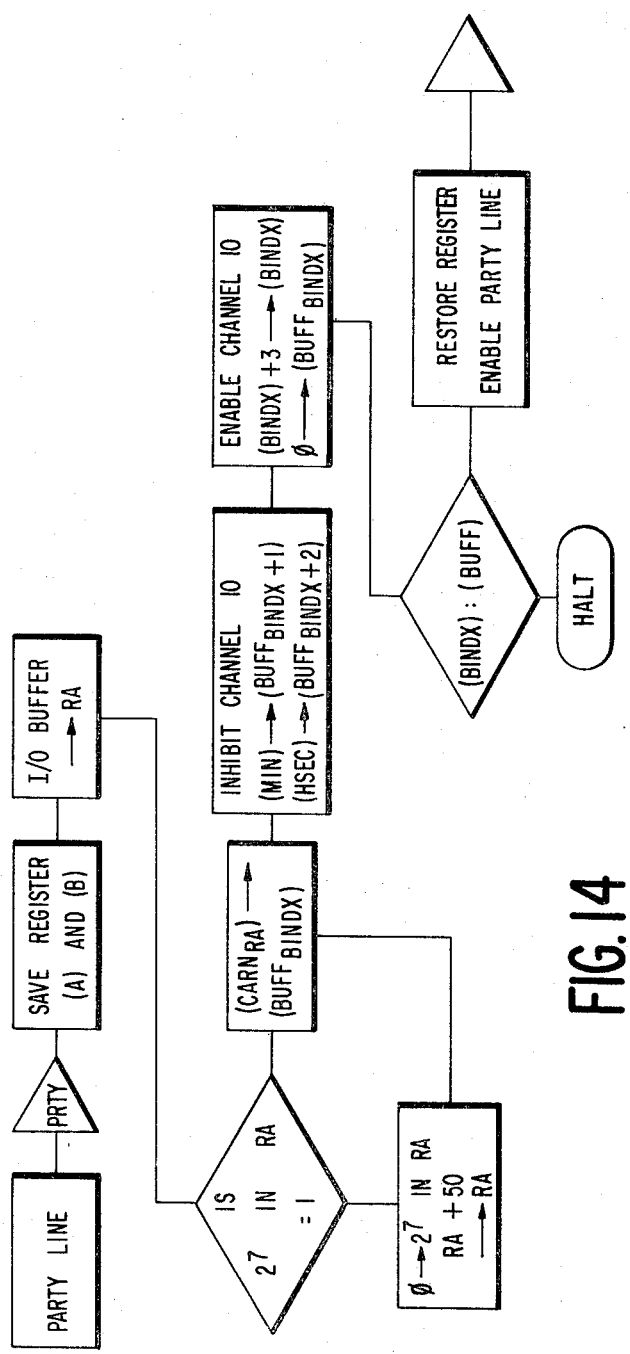
FIG. 14 is a program flow diagram of the party line interrupt subroutine.

A specific example of the preferred embodiment of the program for the general purpose digital computer 44 (FIG. 2) is illustrated by the program flow charts in FIGS. 8 through 14. FIGS. 8a through 8d illustrate the primary program and FIGS. 9a–9b through 14 illustrate subroutines. In order to better understand the disclosed program, FIG. 15 is included to show conceptually the meaning of some of the legends used in the program for identifying certain arrays in the computer storage as well as the use of said arrays in the storage. Two identical sections of storage are defined as the current stack (c) and the previous stack (p). Each of these stacks contain the same arrays. Those arrays are: the hit indication array; the total time array; the lap speed array; the lap number array; and the average speed array. Each array contains 100 locations with locations 1 through 50 corresponding to the 50 channels in the primary system, and locations 51 through 100 corresponding to the 50 channels in the backup system. As a simple example, when a hit indication is presented to the computer for transponder number 7 from the primary system, a hit indication is placed in location 7 of the current stack of the hit array. The total time, lap speed, lap number and average speed for the car carrying the transponder is calculated and stored in location 7 in the respective arrays of the current stack. At the end of the lap, after print out is accomplished, the current stack and previous stack designations are switched so that the data just referred to now is the previous stack data relating to transponder number 7 (pseudo car number 7). New data relating to pseudo car number 7 is entered into the current stack, formally the previous stack. The effect of switching the stack designations is the same as shifting the data from one stack to the other. The backup system hit indication and data for the same car (pseudo car number 7) would be entered in location 57 of the various arrays in the current stack.

Another section of the memory is the interrupt packet buffer (BUFF). This array contains 500 locations, each 3 locations being defined as a packet. The data which is placed into a packet is the pseudo car number in location 1, the minutes elapsed since the start of the race in location number 2, and the hundredths of seconds in location number 3. The pseudo car number and associated time information corresponding to the oldest hit indication always appears in the first packet. The interrupt packet buffer thus serves as a place to stash the hit indications until they can be operated upon by the computer. After the data in the first packet is operated upon, all data in the interrupt packet buffer is shifted up one packet (three locations) by a shift subroutine.

It will be apparent to any one of ordinary skill in the art that the storage arrays shown in FIG. 15 do not necessarily represent any relative physical arrangement of data in the computer. Also, there are other areas of storage which will be apparent by the program flow diagrams.

In the specific example described herein, the input parameters which are entered into the computer prior to the start of a race, may be entered therein on a punched tape in a conventional manner. The input parameters are given below. They are:

Impossible lap time in seconds
Laps in race
Printer option ($\phi$)=No print, 1=print
Printer channel
Punch option ($\phi$=no punch, 1=punch)
Length of track in miles
Transponder number, actual car number (50 maximum)
999 following last (transponder)

The impossible lap time in seconds is a time which is set at less than the minimum possible time for a car to complete one lap. The laps in race represent the number of laps necessary to complete the race. The printer option and punch option indicates whether the output is to be printed or punched out or both. The transmitter number, actual car number provides an indication of the correspondence between the transponder number and the actual car number. In the program, the transponder number is also referred to as the pseudo car number since it also represents the car. However, when readout occurs, the actual car number is used. The sentinel (999) following the last car is merely an indication to the computer that all cars have been read in.

Two of the subroutines in the overall program are interrupt routines and they are initiated by conditions outside of the main program. Whenever the conditions to initiate one of the interrupt subroutines occurs, the interrupt subroutine takes place irrespective of the calculations taking place as a result of the main program. The first interrupt subroutine is the time base generator interrupt and is shown in FIG. 13. The computer clock is programmed to provide an output every one hundredth of a second. Each time one of these clock outputs occurs, the time base interrupt subroutine takes place. Its flow is as follows: The first step is to save the data which is presently in the computer compilation registers A and B. The data of register A is entered into a storage location defined as CKRA and the data in register B is entered into a storage location defined as CKRB. The data in the storage location defined as HSEC represents the hundredths of seconds elapsed. This data is updated by one each time a time base generator clock pulse occurs. The contents of HSEC is compared with the number 600 to see if it has reached a minute. If it has not reached a minute, the data from registers A and B are restored, the time base generator is enabled and the subroutine is over. If it has reached a minute, a zero is entered into location HSEC and the contents of location of MIN is updated by one. Following this, the data originally taken from registers A and B are restored to those registers, the time base generator is enabled, and the subroutine is over. Thus, the time base generator interrupt subroutine operates to continuously update the storage locations HSEC and MIN which respectively contain data representing the hundredths of seconds elapsed since the last recorded minute and the minutes elapsed since the start of the race.

The other interrupt subroutine is the party line interrupt and is illustrated in FIG. 14. Referring back to FIG. 7, the party line interrupt subroutine is initiated in response to the setting of flip flop 164. It will be remembered from the discussion above that flip flop 164 is set each time a new address can be entered into the input/output buffer 160. The party line interrupt subroutine operates to insert the car data into the available packet of the interrupt packet buffer.

The first step is to save the contents of computer compilation registers A and B as done in the previous described subroutine. Next, the contents of the input/output buffer representing the transponder number or pseudo car number is entered into register A. The eighth bit (the bit on the line 27) in register A is compared with a one bit to determine if the hit indication is from the backup or primary system. If it is from the primary system, the car number in the car number array at the location defined by the address in register A is entered into the interrupt packet buffer at a location defined by BINDX. As will appear more fully hereafter, the location in the buffer defined by BINDX represents the first available location in the interrupt packet buffer.

If the hit indication is from the backup system, the eighth bit in the register is zeroed and the number 50 is added to the number in register A with the sum being put back into register A. The purpose of adding number 50 is because the backup indications differ from the primary indications by 50 in the specific example herein. The contents of the register A now determines the car number data to be placed in the interrupt packet buffer. Following this, the time base generator interrupt subroutine is inhibited and the contents of MIN is placed in the interrupt packet buffer at the location BINDX+1 and the contents of HSEC is placed in the interrupt packet buffer at the location BINDX+2. Thus, a full packet is filled for the car just registering the hit indication.

Next, the time base generator interrupt subroutine is enabled, the BINDX location is updated by three so that it now represents the new lowest numbered available location in the interrupt packet buffer. Also, that location is zeroed. The number representing the BINDX position is compared with the number representing the last location in the interrupt packet buffer. If they are the same, the program is stopped because the next hit indication would cause an overflow. If they are not the same, the former contents of registers A and B are restored to registers A and B. Also, the party line is enabled and the subroutine is over. Referring back to FIG. 7, when the party line is enabled, the flip flop 170 is set.

Referring now to FIG. 8, when the primary program is started, the first step is to perform the initialize subroutine. The initialized subroutine is shown in FIG. 9. This subroutine reads in the input parameters from the punched tape and places them in storage. It also zeros the arrays. The first step is to establish the buffer limits. The BUFF, representing the address of the first location in the buffer, is placed into the storage location defined as BINDX. It is also placed in a storage location defined as BUFFS. The latter stays the same throughout the program and always represents the first location of the interrupt packet buffer. As indicated in the description of the party line interrupt subroutine, the data in BINDX changes and represents the first *available* location in the interrupt packet buffer. The first location BUFF is also updated by 1503 and placed in a location defined as BUFFE. The latter represents one packet past the end location in the buffer. Thus, as seen in the description of the party line interrupt subroutine, if the data in BINDX equals the data in BUFFE, there is an overflow and the program is stopped. The time interval is next established by enabling the time base generator. The time base generator and party line subroutines are inhibited for the remainder of the initialized subroutine. The HSEC and MIN locations are zeroed representing the start time of the race. The current and previous stack selections are set at the numbers 1 and 2, respectively, the interrupt packet buffer is zeroed and a one is placed into the location defined by $i$. Next, all of the arrays in the current and primary stacks are zeroed in sequence by location. For example, the designation $\phi$ (HIT $i$, 1) indicates that a 0 is placed in the $i$th (set at 1 initially) location of the HIT array of the current stack. Next a 0 is placed in the corresponding location of the primary stack. The same is done for the finish array, the lap number array, the average speed array, the lap speed array, and the total time array. Following this the $i$ number is advanced by 1 and compared with the number 100 to determine if all stacks have been initialized to 0. As long as the $i$ number is less than 100 the initializing continues. When $i$ equals 100, indicating that all locations in the stack arrays have been zeroed, the input parameters are read in from the punched tape.

The input parameters which are read in are the impossible lap time, the laps in the race, the printer option, the printer channel, the punch option and the length of track in miles. Following this, the information read in is displayed (e.g., by printout or cathode ray tube character display), for the purpose of a visual check. Next, the location in storage defined as NCARS and representing the total number of cars in the race is initialized, or placed at zero. The transponder numbers and car numbers from the punch tape are then read in and placed in storage locations defined as TRNS and CARNO, respectively. After the last car number is read in, the sentinel number 999 from the punch tape is read in and it stops the subroutine.

For each transponder number and car number which is read in during the initialized subroutine, the number stored in NCARS is updated by one, the car number is entered into the CAR array at the location defined by the number in NCARS, and the number in NCARS is entered into the CARN array at the location defined by the transponder number. After all of the transponder numbers and car numbers are read from the punched tape in accordance with the initialize subroutine, the NCARS location contains a number representing the total number of cars in the race, the CAR array contains all of the car numbers in the order as read into the computer, and the array CARN contains numbers in locations defined by the transponder number which represents the car numbers in the array CAR corresponding to the said transponder, e.g., the number $x$ in the $y$ location of CARN means that the actual car number corresponding to the $y$ transponder can be found in location $x$ of the CAR array. Thus, during the operation of the primary program when an address is entered into the input/output buffer, that address represents the transponder or pseudo car number. By obtaining the number contained in the array CARN at the transponder address, and then using that number to designate the location in the CAR array, the actual car number of the car causing the hit indication is obtained.

Referring back to the primary program in FIG. 8, after the initialized subroutine, there is a pause followed by a clear subroutine. The clear subroutine, shown in FIG. 10, is simply an instruction to enable the party line. Following this, the header subroutine is entered. The header subroutine, shown in FIG. 11, is simply an instruction to printout the format heading. As seen from FIG. 11, there are five possible format headings in accordance with the specific embodiment of the invention described herein. Those five headings are:

(1) Lap number, car number.
(2) Position, lap number, car number.
(3) Position, lap number, car number, lap speed.
(4) Position, lap number, car number, lap speed, average speed.
(5) Position, lap number, car number, lap speed, average speed, total time (lead car)/time behind leader (trailing cars with same number of laps as leader).

As is apparent, the most detailed information is obtained by using the format (5) above.

Returning to the primary program of FIG. 8, the first location in the interrupt packet buffer is checked for the existence of data. This is done by comparing the contents of the first location of BUFF with zero. The program continues to examine the first location in buffer until a hit indication is placed therein in the manner described in connection with the party line interrupt subroutine. When the transponder address or pseudo car number is placed in the first location in buffer, the contents of that location becomes the subscript $i$, representing the pseudo car number. The contents of the $i$th location of the FINISH array is compared with zero to determine whether or not this particular car has completed the race in a prior lap. If the car has completed the race in a prior lap, the contents of the $i$th location in the FINISH stack will be equal to one and the shift subroutine will be entered. The shift subroutine will be described in more detail below. In general, it operates to shift the contents of the interrupt packet buffer up by one packet (three location. If the car has not finished the race, a zero will be in the $i$th location of the FINISH array.

Next, it is determined whether or not the car has had a prior hit in the current stack. This is done by comparing the $i$th location of the HIT array in the current stack with zero. The program then branches depending upon whether the car does have a prior hit in the current stack or does not have a prior hit in the current stack. It will be noted that if the car does have a prior hit in the current stack, and if the lap time for that car is greater than the impossible limit, that means that the paricular car causing the hit is the leader and a new lap has just begun.

Assuming the car does not have a prior hit in the current stack, the next step in the program is to calculate the lap time. This is done by subtracting the contents of the $i$th location of the total time array in the previous stack from the time contained in the second and third locations of the buffer. It will be remembered that the data in the second and third location of the interrupt packet buffer represents the time in minutes and hundredths of seconds elapsed between the start of the race and the time and current hit occurred. The data in the $i$th position of the total time array of the previous stack represents the time in minutes and hundredths of seconds elapsed between the start of the race and the previous hit from the same car. Thus, the difference represents the lap time for that car.

Next the program determines whether or not this is the car's initial hit of the race. The purpose of this step in the program is to bypass a comparison of the lap time with the limit lap time if this is the first hit for the car in the race. Thus, as indicated in the program flow chart, if the lap number taken from the $i$th position of the LAPNO array of the previous stack is equal to $-1$, then a zero is entered into the lap-time location. If this is not the car's initial hit of the race, the comparison will result in a NO indication. This is followed by a comparison of the lap time with the limit lap time. If the comparison indicates that the lap time is not valid, the shift subroutine is entered. If the lap time is valid, or if this is the first lap of the race for the automobile, the program then operates to fill the $i$th location of the arrays in the current stack. As illustrated, the time in the buffer is entered into the $i$th location of the total time array of the current stack, and a 1 is entered into the $i$th location of the hit array of the current stack, indicating a hit for this car. The contents of the $i$th location of the lap number array in the previous stack is updated by 1 and placed in the $i$th location of the lap number array of the current stack. The average speed for the car is calculated and entered into the $i$th location of the average speed array of the current stack. Then, the lap speed is calculated and entered into the $i$th location of the lap speed array of the current stack. Following this, the shift subroutine is entered for the purpose of shifting the contents of the input packet buffer 1 packet upward.

The next step in the program is to compare the current lap number for the particular car with the total number of laps in the race to determine whether or not the car has just completed the total number of required laps. If the results of the comparison is a NO indication, the program goes back to the idle loop which is indicated by point 1 of the program (the number 1 in the circle), for the purpose of examining the first location of the buffer for the next hit to be processed. If, the comparison indicates that the car has just completed the total number of laps, a 1 is inserted into the $i$th location of the FINISH array thereby indicating that the $i$th car has finished the race and the program then goes to the point 6 of the program.

Going back to point 5 in the program, it will be remembered that the step prior to the point 5 was a decision whether or not the car had a prior hit in the current stack. The routine followed if the car did not have a prior hit in the current stack has been explained. If the car has had a hit in the current stack, the lap time is calculated by subtracting the contents of the $i$th location of the total time array in the current stack from the time in the buffer. The resuling lap time is then compared with the LIMIT to see if the lap time is valid. If the lap time is not valid, that means the lap hit was due to an error and the shift subroutine is entered. Following the shift subroutine, the program goes back to point number 1. If the lap time is valid, that means that the car resulting in the second hit for the current stack is the lap leader and the program proceeds to the point 6.

To summarize thus far, the point 6 in the program is reached if the car registering the hit presently being processed has registered a prior hit in the current stack and thereby is the lap leader, or if the car has just completed the total number of laps in the race. The program then operates to examine the stored scoring data for all of the cars to determine whether or not each has a hit in the current stack. For those cars which do not have a hit in the current stack, the data in the previous stack is transferred to the corresponding location of the current stack. This is accomplished by first making $i$ equal to 1 and examining the $i$th location of the hit array in the current stack for a 1 or 0 period. If there is a hit indication in this location the $i$ value is updated by 1 and the next location is examined. This continues until a location in the current stack is examined which does not contain a hit. When this occurs, the data in the $i$th location of the total time array of the previous stack is entered into the corresponding location of the current stack; the data in the *i*th location of the lap number array from the previous stack is entered into the corresponding location of the current stack; the data in the *i*th location of the average speed array in the previous stack is entered into the corresponding location of the current stack; and the data in the *i*th location of the lap speed array of the previous stack is entered into the corresponding location of the current stack. Following this the *i* number is updated by 1. Each time the *i* number is updated by 1, it is compared with the number in NCARS which represents the total number of cars in the race. When *i* is greater than the total number of cars in the race, this means that all cars in the primary stack have been examined and point 9 is reached in the program.

The program then proceeds to examine the hit indications for all cars in the backup portion of the arrays and to operate on them in the same manner as explained above for the primary portion of the arrays. This is accomplished by initially setting *i* at 51 and comparing the data in the *i*th location of the hit array of the current stack with zero. If the car identified by pseudo number (*i*–50) has a hit indication in the location of the HIT array of the current stack, the *i* number is updated by one and the next hit location is compared with zero. If there is no hit indication in the said location, the data representing total time, lap number, average speed, and lap speed from the previous stack (*p*) is entered into the corresponding locations of the current stack. Each time the *i* value is updated by 1 (*i*–50), is compared with the total number of cars in the race. When *i*–50 is greater than the total number of cars in the race, point 13 in the program is reached. At this point, the hit indications for all cars in both the primary and backup portions of the arrays have been examined. Also, at this point, the current stack will be filled with data for all cars in the race even though some of the cars have not recorded a hit in the current stack.

At point 13 the program proceeds to determine whether the data in the backup portion of the stack or the data in the primary portion of the stack for each car should be used for the print out and for determining the positions of the cars in the race. For each car in the race, the primary lap number and the backup lap number are compared. This is indicated between points 14 and 16 in the program. If the primary lap number is greater than or equal to the backup lap number, there is no transfer of data and the next car is examined in the same manner. If the backup lap number is greater than the primary lap number the total time, lap number, average speed, and lap speed from the backup location corresponding to that car is entered into the primary location corresponding to that car in the proper arrays. This is indicated between points 16 and 15 of the program. When the data for all cars have been examined in this manner, *i* will be greater than the total number of cars in the race and point 17 in the program will be reached.

Between points 17 and 19, the program operates to clear a USE array. This array is used subsequently to determine when the relative position of a car has been determined. The USE stack is cleared by making *i* equal to 1 and entering zero into the *i*th location of the USE array. This is followed by continuously updating the value *i* by 1 and entering zero into the *i*th location of the USE array. When the USE array has been completely zeroed, *i* will be greater than the number of cars in the race and point 19 of the program will be reached.

Between points 19 and 21, the program operates to load a position array with the numbers 1 through 5*y*, representing pseudo cars 1 through 50, in accordance with the positions of those cars in the race. The position is determined by a repetitive comparison technique which compares the lap number and the total time for all cars. Basically, the comparison operates as follows. Initially a comparison is made between cars having pseudo car numbers 1 and 2. The comparison takes the form of comparing the respective lap numbers. If the lap numbers are the same, then the total time of the cars is compared. Of the two, the car which is the leader is then compared with the third car. Of those two, the car which is the leader is then compared with the fourth car. This is continued until a comparison is made with the fiftieth car. After this comparison is made, the number corresponding to the leader is placed into the first position of the position (POS) array. Next, the sequential comparison technique is repeated except that the car which was shown to be the lead car by the last sequential comparison is eliminated from the present sequential comparison. This technique is continued until all positions are determined and the POS array is filled.

Specifically, *i* is initially assigned the value of 1 and *k* is also initially assigned the value of 1. The *i*th location of the USE array is checked to see if this car has already been used. Initially, none of the cars have been used. If a car has been used, that means that the corresponding pseudo car number has already won a sequential comparison and has been placed in the POS array. If the *i*th car has been used, the *i* number is updated by 1 and the next USE location is examined. If the *i*th car has not been used, point 22 in the program is reached. The designation *j* is assigned the value of *i*+1 and compared with the total number of cars in the race to determine if all cars have been compared with the *i*th car in the process. If *j* is equal to or less than the total number of cars in the race, that means that all cars have not been compared in the sequential comparison technique and point 25 in the program is reached. Next, the *j* location from the USE array is checked to see if the *j*th car has previously been used. If it has been, the point 26 in the program is reached and the next car is examined by updating *j* by 1 and returning to point 23 in the program. If the *j* car has not been previously used, the point 27 is reached and the comparison between the *j*th and *i*th cars takes place. First, the lap number stored in the *i* location of the lap number array of the current stack is compared with the lap number stored in the *j* location of the lap number array of the current stack. If the two lap numbers are equal, then the total times for the *i* and *j* cars are compared. If the comparison indicates that, of the two cars, the *i* car is the leader, point 26 in the program is reached. On the other hand, if the comparison indicates that the *j* car is the leader of the two, then point 28 in the program is reached. If the *i* car is the leader of the two, as seen by point 26 in the program, there is no change in the *i* number but the *j* number is updated by 1 for a subsequent comparison between the old *i* car and a new *j* car. At point 28, which is reached when the *j* car is the leader of the two, the *j* number becomes the *i* number and *j*+1 becomes the new *j* number. By the above described sequence, the sequential comparison between all cars takes place. Returning to point 23 in the program, when all cars have been compared, the *j* number will be greater than the total number of cars in the race. Thus, point 24 will be reached and the conclusion to be drawn is that the present *i* number represents the car which is the leader of the sequential comparison. The *i* number is then placed into the K location of the POS array. It will be remembered that K was initially assigned the value of 1 so that for the first sequential comparison, the *i* number will be placed in the first location of the POS array. K is then updated by 1 for the next sequential comparison. Also, a 1 is entered into the *i* location of the USE array to indicate that the *i*th car has been used. Also, *i* is again made equal to 1 and the program shifts back to point 20 for the start of a new sequential comparison. When all cars have been used, the step which checks the use of each car will always give a YES indication. This results in continuously updating *i* until *i* becomes greater than the total number of cars in the race. This indicates that all cars have been used (inserted into the respective positions of the POS array), and point 21 in the program is reached.

At point 21 in the program the following sequence takes place. The lap number of the lead car is entered into the location defined as LLAP. This is done by making the number in the first location of the POS array equal to $i$ and inserting the data from the $i$th location of the lap number array of the current stack into the LLAP location. It will be noted that $i$ represents the pseudo car number. The total time for the lead car is then entered into LTIME representing the lead time, a 1 is entered into SWITCH, and the time for the leader is entered into the location defined as TIME. Next, a comparison is made between the data in the location in WIN and zero to determine if a winner has previously been indicated. The location WIN will initially contain a zero and this results in an indication that no winner has been indicated. Following this, a determination is made as to whether the current leader is the winner of the race. This is accomplished by comparing the contents of LLAP representing the lap number for the leader with the contents of LAPC representing the total number of laps in the race. If the current leader is not the winner, the point 31v in the program is reached. If the current lap leader is the winner, a 1 is placed in the location WIN and the information is printed out that the car in position 1 is the winner. Following this, point 31v in the program is reached.

As seen in the drawing, the program can take 5 possible routes from point 31v. This depends upon the particular format being used. The five formats have been described above and for the purpose of discussion, it will be assumed that format number 5 is the one which is to be outputted. In connection with format number 5, six items of information about each car are printed out provided the car is either the lead car or it has completed the same number of laps as the leader. For those cars which have not completed the same number of laps as the leader, the time behind the leader is not printed out. Whether or not the time is to be printed out for any particular car in question depends upon whether or not the location SWITCH contains a 1 or a 0. If it contains a 1, the time is to be printed out whereas if it contains a 0, the time is not printed out. It will be noted, referring back to the second step following point 21, that a 1 was placed in the location SWITCH so that the data printed out for the initial car, which is the lap leader, will include the time.

Thus, when point 31v is reached, the program goes immediately to point 31e, assuming format 5 is to be operated. A check of the SWITCH location indicates that the time is to be outputted and the output system prints out the lap number, car number, lap speed, average speed, and time for the $i$th car which initially is the lead car. After this data is outputted, the value K is updated by 1 and compared to the total number of cars to determine if the data for all cars has been outputted. If all cars have not been outputted, the number in the K location of the POS array becomes the new $i$ number representing the pseudo car number which is in the second position. The lap number for this car is then compared with the lap numbers completed by the leader. If it has not completed the same number of laps as the leader, the SWITCH location is zeroed and the program returns to point 31v. If, on the other hand, this car has completed the same number of laps as the leader, the total time for that car is subtracted from the total time for the leader with results representing the time behind the leader. This is entered into the TIME location and the program returns to point 31v. At this point, the contents of the SWITCH location is again examined to determine whether or not the contents of the TIME location is to be outputted. The data relating to this car is then outputted and following this the K number is again updated by 1. The printout, updating of the K number, and determination of whether or not the time behind the leader is to be printed out, continues until the data relating to all of the cars have been printed out. When this occurs, K will be greater than the total number of cars in the race and thus the point 35 in the program will have been reached.

After the printout described above is accomplished, the system is ready for processing the hits on the next lap. At point 35 in the program, the header subroutine, described previously, is entered. Following the header subroutine, the current and previous stacks are switched. Effectively, the data in the current stack now represents previous data since it applies to the old lap. Instead of actually removing the data from the current stack and placing it in corresponding locations of the previous stack, the designations of current and previous is switched for the two stacks. Following this, the hit array in the current stack is zeroed. This is accomplished by initially assigning $i$ the value of 1 and zeroing the $i$ location of the hit array in the current stack; $i$ is then updated by 1 and the zeroing process continues until all of the locations in the hit array of the current stack have been zeroed. At this time, $i$ will be greater than 100 and the program will return to point 1 which is the point at which the first location of the interrupt packet buffer is examined for a hit indication.

The entire primary program has now been described in detail and all of the subroutines except for the shift subroutine have been described. The shift subroutine is illustrated in FIG. 12 and proceeds as follows. Whenever a shift subroutine is entered, the party line interrupt subroutine is inhibited. Following this, the contents of the location BINDX, representing the first available location in the interrupt packet buffer, is compared with the contents of the BUFFS representing the first location in the buffer to see if the buffer has more than one packet filled. If BINDX is equal to BUFFS, then there is no need to change the BINDX designation. If BINDX is greater than BUFF, it is changed by three (corresponding to one packet shift). This is accomplished by subtracting the number 3 from the data in BINDX and placing the results in the location BINDX. The contents of the buffer is then shifted up one packet by assigning $i$ the value 1 and $j$ the value 2 and comparing the $j$ packet in the buffer with 0. If the $j$ packet is equal to zero, then no further shift is necessary since there is no data in the second or subsequent packets. If the $j$ packet is not zero, then the contents of the $j$ packet is inserted into the $i$ packet of the buffer and the $i$ and $j$ values are updated by 1. This process continues until there is no data in the $j$ packet of the buffer. Following this, the clear subroutine is entered and the shift subroutine is over.

Although the program flow charts shown in FIGS. 8 through 15 are sufficient to teach any one of ordinary skill in the art of programming how to program a general purpose computer to carry out the functions of the present invention, a very specific example of the actual instructions, written in program language, for carrying out the program shown in FIGS. 8 through 14, appears in the appendix to this application.

What is claimed is:
1. A system for scoring an event among a plurality of participating entities comprising:
   electronic means for generating an address signal identifying an entity as it reaches a predetermined position in said event,
   means for separating said address signals in accordance with the entities represented,
   sequencing means for receiving said address signals in random order as they occur and applying equivalent digital address signals thereto to an output thereof in a predetermined order, and
   processing means connected to receive said digital equivalents for maintaining an up-to-date calculation of the relative positions of said entities in said event.
2. A system for scoring an event as claimed in claim

1 wherein said event is a race and said predetermined position represents a line across a race course traversed by said entities and the occurrence of an address signal is defined as a "hit" for the particular entity, said processing means comprises a digital computer programmed to:
  (a) accumulate an indication of time from a reference time such as the start of the race
  (b) store said accumulated indication of time when a hit occurs for each entity
  (c) store an indication of the relative positions of each entity in the race, and
  (d) transfer said stored times and position indications to an output of said computer.

3. A system for scoring as claimed in claim 1 wherein said means for generating an address signal comprises:
  a plurality of RF signal generating means for generating a plurality of different output radio signals, said plurality of RF signal generating means being affixed to said plurality of entities respectively, and
  radio frequency means for picking up the output radio signals from any entity affixed generating means only when said entity passes said predetermined position.

4. A system for scoring an event as claimed in claim 3 wherein said event is a race and said predetermined position represents a line across a race course traversed by said entities and the occurrence of an address signal is defined as a "hit" for the particular entity, said processing means comprises a digital computer programmed to
  (a) accumulate an indication of time from a reference time such as the start of the race
  (b) store said accumulated indication of time when a hit occurs for each entity
  (c) store an indication of the relative positions of each entity in the race, and
  (d) transfer said stored times and position indications to an output of said computer.

5. A system for scoring as claimed in claim 1 wherein said means for generating an address signal comprises:
  (a) a plurality of transponders responsive to a common radio signal for radiating a plurality of unique radio signals respectively, each transponder being affixed to one entity,
  (b) a transmitter means for radiating said common signal, said transmitter means including an antenna positioned so that the strength of said common signal in close proximity to said predetermined position is just sufficient to turn on any of said transponders, and
  (c) a radio signal receiver means for receiving said radio signals radiated by said transponders.

6. A system for scoring as claimed in claim 5 wherein said transmitter antenna is a dipole antenna positioned just below the surface of a race track and extending along said track coincident with a line which is said predetermined position, and each of said transponders comprising means responsive to said common signal being above a predetermined threshold level for generating a radio frequency signal and means for modulating said radio frequency signal with an audio frequency signal, the combination of said RF and audio signals uniquely identifying the entity to which said transponder is fixed, and wherein said receiver means includes a directional RF antenna positioned down track from said predetermined position with said receiver antenna beam pattern intersecting said predetermined position.

7. A system for scoring an event as claimed in claim 6 wherein said event is a race and said predetermined position represents a line across a race course traversed by said entities and the occurrence of an address signal is defined as a "hit" for the particular entity, said processing means comprises a digital computer programmed to
  (a) accumulate an indication of time from a reference time such as the start of the race
  (b) store said accumulated indication of time when a hit occurs for each entity
  (c) store an indication of the relative positions of each entity in the race, and
  (d) transfer said stored times and position indications to an output of said computer.

8. A system for scoring a racing event between participating units, comprising:
  (a) a plurality of signal generating means for generating a plurality of unique signals respectively, said plurality of generating means being affixed to said units respectively, whereby each unique signal uniquely identifies the unit to which it is affixed,
  (b) means for receiving one of said unique signals when a unit passes a predetermined position in said race, whereby the time of reception represents the time at which the unit identified by said unique signal arrived at said position,
  (c) detector means, having a plurality of output terminals at least equal to and representing said units and connected to the output of said receiving means, for generating a logic output signal on the one of said output terminals representing the said unit corresponding to said received unique signal,
  (d) storage and sequencing means connected to the output terminals of said detector means for storing said logic signals randomly as they are generated and generating unit address signals corresponding to the stored logic signals in accordance with a preset sequence, and
  (e) processing means connected to receive said address signals for maintaining an up-to-date record of the relative position of all said units in said race.

9. A system as claimed in claim 8 wherein said storage and sequencing means comprises:
  (a) a plurality of channels, at least one for each output terminal of said detector means, each of said channels comprising;
    (i) storage means responsive to a logic signal on one of said output terminals for storing said logic signal,
    (ii) a channel gating input terminal, and
    (iii) means responsive to a gating signal at said gating input and a logic signal stored in said storage means for generating one of said unit address signals identifying the unit which caused the said logic signal to be generated;
  (b) a sequence gating input terminal for receiving a gating signal, and
  (c) a plurality of interchannel sequence control gating means connected in series for controlling the sequence of application of said gating signal to said channel gating terminals.

10. A system as claimed in claim 9 wherein each of said interchannel sequence control gating means comprising:
  (a) first and second input terminals and an output terminal,
  (b) said first input terminal being connected to said channel storage means of the preceding channel,
  (c) said output terminal being connected to said channel gating terminal for the succeeding channel,
  (d) said second input terminal being connected to the output terminal of the preceding interchannel gating means, except for the first interchannel gating means which has its second input terminal connected to said sequence gating input terminal, and
  (e) means between said first and second inputs and said output, for passing a gating signal on said second input to said output only in the absence of a logic signal stored in the channel storage means connected to said first input.

11. A system as claimed in claim 9 wherein said processing means is a programmable digital computer being connected to said sequence gating terminal and to said storage and sequence means output for receiving said unit address signals, said digital computer being programmed to perform the method comprising the steps of:
- (a) continuously recording, in a memory, the time elapsed from the start of said race,
- (b) in response to each input unit address signal, storing said recorded time elapsed, representing current total time for the corresponding unit, and said unit address in a buffer storage,
- (c) storing in an array of said memory an indication for each unit when said unit crosses said predetermined location, said indication being identified as a current hit and said array being identified as a current hit array,
- (d) calculating current scoring data for each said unit for which a unit address is inserted in said buffer and inserting said current scoring data into an array of said memory,
- (e) in response to each unit address, checking said current hit array for the existence of a current hit indication for the unit represented by said unit address,
- (f) outputting the most recent calculated said scoring data for each unit if the said checking step above indicates the existence of prior hit indication,
- (g) erasing all hit indications in said current hit array, and
- (h) identifying said stored current scoring data as prior scoring data.

12. A system as claimed in claim 11 wherein said scoring data comprises the lap number completed by each unit and wherein the step of calculating current scoring data comprises adding the number one to the prior lap number stored in said memory to obtain the current lap number.

13. A system as claimed in claim 12 wherein said scoring data further comprises the average speed for each unit and wherein the step of calculating current scoring data further comprises multiplying said current lap number by the lap distance and dividing by the total time for said unit.

14. A system as claimed in claim 13 wherein the method performed by said programmed computer further comprises the steps of:
- (a) identifying said current total time for each unit as the prior total time for each unit following the outputting of said scoring data,
- (b) in response to each new unit address signal, calculating the current lap time for said unit by subtracting the total time obtained in response to the prior address signal for said unit from the current total time for said unit, and
- (c) comparing said current lap time with a predetermined limit to determine if the lap is valid or invalid.

15. A system as claimed in claim 14 wherein the step of outputting comprises:
- (a) determining the relative positions of each unit in the race by performing multiple sequential comparisons between all cars on the basis of said lap numbers and said total times,
- (b) storing an indication of all units in the order of their relative positions,
- (c) for each unit, in the order determined by said last mentioned stored indication, transferring the current scoring data to an output means if said unit has a current hit indication in said hit array, and transferring the prior scoring data to said output means if said unit does not have a hit indication in said hit array.

16. A system as claimed in claim 8 further comprising manually operable means, having a plurality of output terminals at least equal in number to the number of units in the race, for selectively generating logic signals on any of said output terminals.

17. A system as claimed in claim 16 wherein the output terminals of said manually operable means are connected to said storage and sequencing means and wherein said storage and sequencing means comprises:
- (a) a plurality of channels divided into a first group at least equal in number to and connected respectively to the output terminals of said detector means and a second group at least equal in number to and connected respectively to the output terminals of said manually operable means, each of said channels comprising:
  - (i) storage means, responsive to the logic signal on said output terminal which is connected to said channel, for storing said logic signal,
  - (ii) a channel gating input terminal, and
  - (iii) means responsive to a gating signal at said gating input and a logic signal stored in said storage means for generating one of said unit address signals, whereby the unit address generated by each channel in said first group of channels uniquely identifies the unit causing the logic signal stored in said channel, and the unit address generated by a corresponding one of said channels in said second group of channels uniquely identifies the same said unit and identifies that the said unit address is from said second group of channels,
- (b) a sequence gating input terminal for receiving a gating signal, and
- (c) a plurality of interchannel sequence control gating means, connected in series, for controlling the sequence of application of said gating signal to said channel gating terminals.

18. A system as claimed in claim 17 wherein each of said interchannel sequence control gating means comprises:
- (a) first and second input terminals and an output terminal,
- (b) said first input terminal being connected to said channel storage means of the preceding channel,
- (c) said output terminal being connected to said channel gating terminal for the succeeding channel,
- (d) said second input terminal being connected to the output terminal of the preceding interchannel gating means, except for the first interchannel gating means which has its second input terminal connected to said sequence gating input terminal, and
- (e) means between said first and second inputs and said output, for passing a gating signal on said second input to said output only in the absence of a logic signal stored in the channel storage means connected to said first input.

19. A system as claimed in claim 17 wherein said processing means is a programmable digital computer being connected to said sequence gating terminal and to said storage and sequence means output for receiving said unit address signals, said digital computer being programmed to perform the method comprising the steps of:
- (a) for each unit address received by said computer, check if the same unit address has been received during the current lap of the race,
- (b) for each initial reception of a unit address during the current lap, record an identifying signal in an array (hit indicator array) of a memory,
- (c) for each unit address, calculate and store scoring data in said memory,
- (d) for a second reception of a unit address during a current lap, transfer one set of scoring data for each unit to an output of said computer and erase the contents of said hit indicator array thereby indicating the start of a new lap.

20. A system as claimed in claim 19 wherein the step of calculating and storing scoring data in said memory comprises accumulating the number of times each unit address is received, storing said accumulated number as the number of laps completed by the unit identified by said unit address, and storing a time indication for each unit address indicating the time said unit address was last received by said computer.

21. A method for storing a race between multiple participating units, wherein the race covers multiple laps around a track and a unit identifying address signal is generated each time a unit crosses a preset location on the track, said method comprising:
  (a) continuously recording in a memory the time elapsed from the start of said race,
  (b) in response to each unit address signal, inserting said recorded time elapsed, representing current total time for said unit, and said unit address in a buffer storage,
  (c) storing in an array of said memory an indication for each unit when said unit crosses said predetermined location, said indications being identified as a current hit and said array being identified as a current hit array,
  (d) calculating current scoring data for each said unit for which a unit address is inserted in said buffer and inserting said current scoring data into an array of said memory,
  (e) in response to each unit address, checking said current hit array for the existence of a current hit indication for said unit stored therein,
  (f) outputting the most recent calculated said scoring data for each unit if the said checking step above indicates the existence of a prior hit indication,
  (g) erasing all hit indications in said current hit array, and
  (h) identifying said stored current scoring data as prior scoring data.

22. A method as claimed in claim 21 wherein said scoring data comprises the lap number completed by each unit and wherein the step of calculating current scoring data comprises adding the number one to the prior lap number stored in said memory to obtain the current lap number.

23. A method as claimed in claim 22 wherein said scoring data further comprises the average speed for each unit and wherein the step of calculating current scoring data further comprises multiplying said current lap number by the lap distance and dividing by the total time for said unit.

24. The method as claimed in claim 23 further comprising the steps of:
  (a) identifying said current total time for each unit as the prior total time for each unit following the outputting of said scoring data,
  (b) in response to each new unit address signal, calculating the current lap time for said unit by subtracting the total time obtained in response to the prior address signal for said unit from the total time obtained in response to the present address signal for said unit, and
  (c) comparing said current lap time with a predetermined limit to determine if the lap is valid or invalid.

25. The method as claimed in claim 24 wherein the step of outputting comprises:
  (a) determining the relative positions of each unit in the race by performing multiple sequential comparisons between all cars on the basis of said lap numbers and said total times,
  (b) storing an indication of all units in the order of their relative positions,
  (c) for each unit, in the order determined by said last mentioned stored indication, transferring the current scoring data to an output means if said unit has a current hit indication in said hit array, and transferring the prior scoring data to said output means if said unit does not have a hit indication in said hit array.

References Cited

UNITED STATES PATENTS

| 3,054,100 | 9/1962 | Jones | 343—6.5 |
| 3,209,351 | 9/1965 | Davis | 343—6.5 |
| 3,344,408 | 9/1967 | Singer et al. | |

RODNEY D. BENNETT, Primary Examiner

M. F. HUBLER, Assistant Examiner

U.S. Cl. X.R.

235—152; 340—23, 408; 343—5